United States Patent
Roland et al.

(10) Patent No.: US 10,795,688 B2
(45) Date of Patent: Oct. 6, 2020

(54) SYSTEM AND METHOD FOR PERFORMING AN IMAGE-BASED UPDATE

(71) Applicant: Datto, Inc., Norwalk, CT (US)

(72) Inventors: John Roland, Fairfield, CT (US); Chad Kosie, Norwalk, CT (US); Philipp Heckel, Ladenburg (DE)

(73) Assignee: DATTO, INC., Norwalk, CT (US)

( * ) Notice: Subject to any disclaimer, the term of this patent is extended or adjusted under 35 U.S.C. 154(b) by 277 days.

(21) Appl. No.: 16/042,399

(22) Filed: Jul. 23, 2018

(65) Prior Publication Data

US 2020/0026524 A1    Jan. 23, 2020

(51) Int. Cl.
- *G06F 9/4401* (2018.01)
- *G06F 3/06* (2006.01)
- *G06F 8/658* (2018.01)

(52) U.S. Cl.
CPC .............. *G06F 9/441* (2013.01); *G06F 3/065* (2013.01); *G06F 3/0619* (2013.01); *G06F 3/0673* (2013.01); *G06F 8/658* (2018.02)

(58) Field of Classification Search
CPC ...... G06F 3/0619; G06F 3/065; G06F 3/0673; G06F 8/658; G06F 9/441
See application file for complete search history.

(56) References Cited

U.S. PATENT DOCUMENTS

| | | | |
|---|---|---|---|
| 6,938,250 B2 | 8/2005 | Cohen et al. | |
| 8,239,662 B1 | 8/2012 | Nelson | |
| 8,429,639 B2 | 4/2013 | Jirka | |
| 8,997,085 B2 | 3/2015 | Cross et al. | |
| 9,641,406 B1 | 5/2017 | Allen | |
| 9,740,501 B2 | 8/2017 | Oza | |
| 2010/0205594 A1 | 8/2010 | Jirka | |
| 2014/0344563 A1* | 11/2014 | Kim | G06F 9/4418 713/2 |
| 2016/0026485 A1* | 1/2016 | Araujo | G06F 9/445 718/1 |
| 2017/0212793 A1* | 7/2017 | Choi | G06F 9/441 |

OTHER PUBLICATIONS

"Block-Based OTAs," 4 pages (last updated Jan. 10, 2018) <https://source.android.com/devices/tech/ota/nonab/block>.
"Firmware over-the-air: package-based vs image-based updates," 4 pages (2015) <https://mender.io/blog/package-vs-image>.
"How to make Board Image Updates," SIEMENS, Industry Online Support Technical Forum, 1 page (2017) <https://support.industry.siemens.com/ww/en/posts/how-to-make-board-image-updates/164405?page=0&pageSize=10>.

* cited by examiner

*Primary Examiner* — Terrell S Johnson
(74) *Attorney, Agent, or Firm* — Fay Sharpe LLP

(57) ABSTRACT

A target device operating on a first operating system can receive an incremental update for a second operating system and store in a first data set a snapshot of the second the second operating system based on the incremental update. The target device may then export an image of the second operating system to a second data set and boot into the second image. The target device may receive operating system updates, build operating system images in the background, and boot into the updated operating system when the process is complete. Storing snapshots of the incremental updates and previous operating system images allows for reversion to old operating systems.

33 Claims, 23 Drawing Sheets

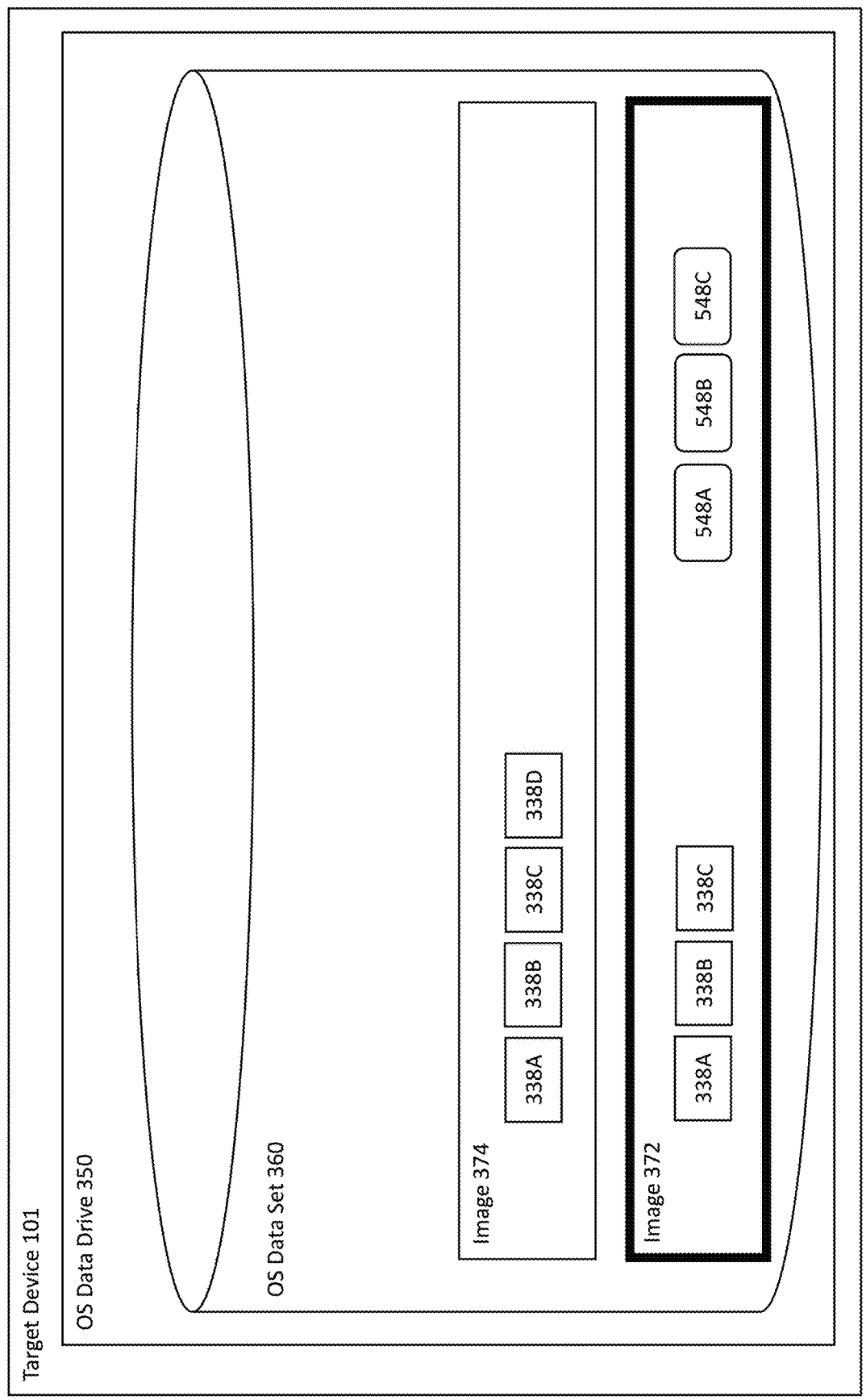

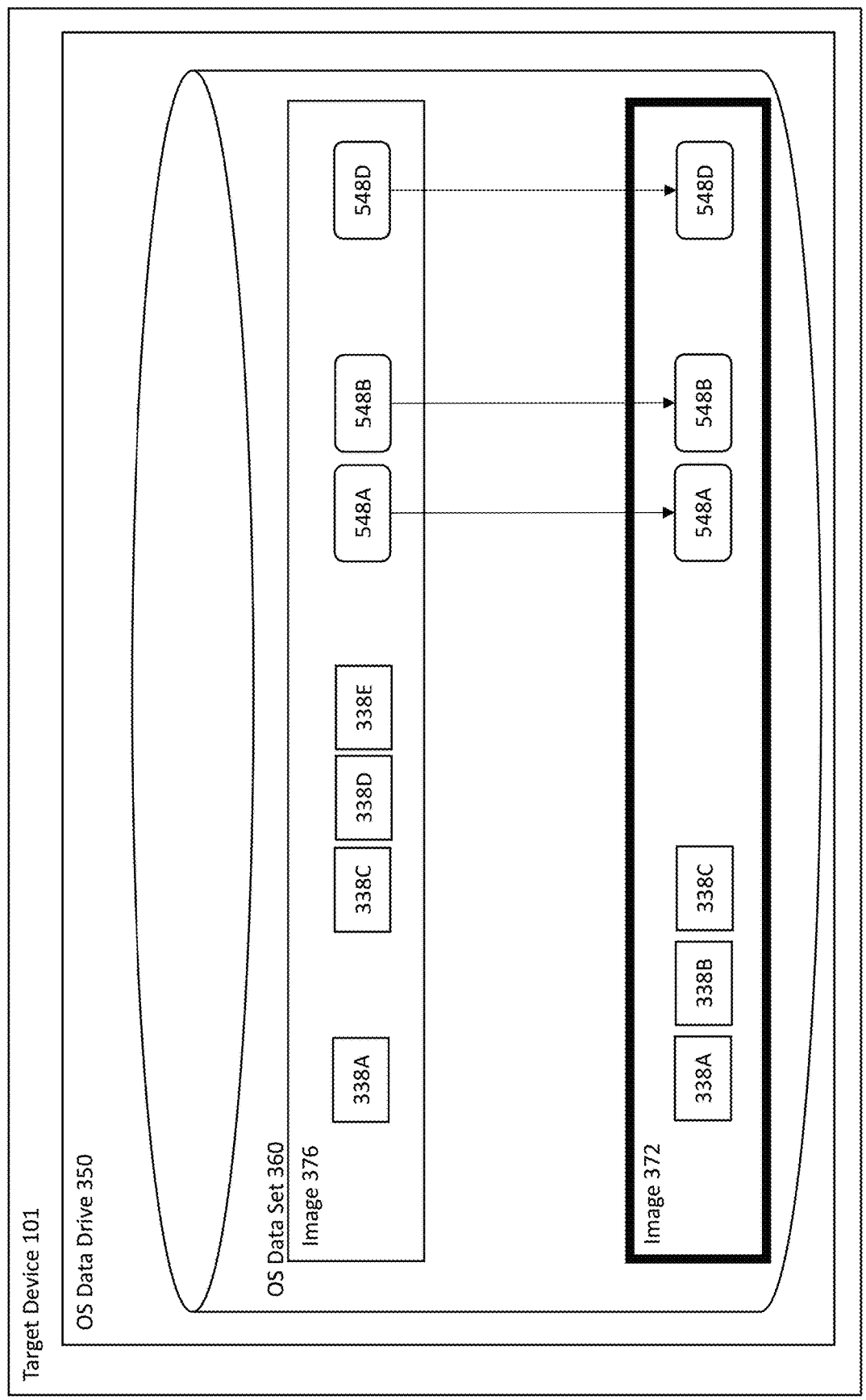

SYSTEM AND METHOD FOR PERFORMING AN IMAGE-BASED UPDATE

FIELD OF THE INVENTION

The present innovations generally address methods and systems for updating device software. More particularly, the present innovations related to updating an Operating System (OS) on a target device using an image-based update.

BACKGROUND

Computer systems rely on operating systems to manage a wide variety of tasks ranging from control of hardware to myriad types of computations. Due in part to the complex and wide range of tasks performed by operating systems, periodic updates are required. These updates can make a variety of changes, including, but not limited to changing the graphical user interface (GUI), updating security measures, improving or adding to various operating system functions, fixing bugs, etc.

Updating an operating system can take a lot of time, especially when it must be built on the computer for which it will be used. Downtime during updating can cause significant problems for computer users, such as reduced productivity, interruptions in services provided by the users, and potential problems for failed updates. Accordingly, it is desirable to develop methods of updating operating systems that minimize downtime for computer users while simultaneously providing other options in the event of a failed update.

Updating operating systems can be made more complicated when a software manager is tasked with updating a large number of devices. For example, some computer users can implement business continuity and disaster recovery (BCDR) systems that are managed by a software manager. A BCDR system typically includes a backup system that regularly backs up data in a computer system's hard drives. When a software manager wants to update each BCDR across a large range of users, some of the BCDR systems may be running different operating system releases or versions. Furthermore, each BCDR system may have local changes specific to that device. These differences and local changes can complicate the process of updating multiple BCRD systems. Additionally, operating system packages can be large, and it is inefficient to provide full operating system packages to each BCDR.

One proposed solution is package-based update systems. A package-based update system provides an update to a device that utilizes multiple software packages that can each be installed individually. This allows for partial changes to system software, which are smaller to transfer and quicker to install. However, package-based updates increase the likelihood of errors due to the interaction of the newly installed package and existing system software because it is challenging to test the possible problems that can arise from each package-based update.

Accordingly, image-based update systems have been implemented to address some of these problems. For example, U.S. Patent App. Pub. No. 2010/0205594 A1 discloses an image-based software update that uses pre-built appliance images that reduces downtime and avoids failures based on mismatch between appliance states and the computing components. However, these image-based updates require sending and storing large image files, and do not adequately provide for reliable reversion to previous software releases.

SUMMARY

The present disclosure is directed at systems and methods for updating an operating system or other software on a target device. According to some embodiments a method of updating an operating system on a target device using incremental updates, includes: storing, in a target device memory a first operating system image according to a first file system on the target device; storing, in the target device memory, a snapshot of the first operating system image in a target-device-held series of snapshots according to a second file system on the target device that is snapshot capable; receiving, by the target device and from a remote storage device, data equivalent to a snapshot of a second operating system image, the second operating system image being an image of an updated version of the first operating system image; forming the snapshot of second operating system image from the data equivalent to the snapshot of the second operating system image; storing, in the target device, the snapshot of the second operating system image in the target-device-held series of snapshots according to the second file system on the target device; exporting, to the target device memory, a second operating system image containing data representative of the snapshot of the second operating system image; storing, in the target device memory the second operating system image according to the first file system on the target device; and booting the target device using the second operating system image.

According to some embodiments the equivalent data of the snapshot of the second operating system image is an incremental operating system update representative of a difference between the snapshot of the first operating system image and the snapshot of the second operating system image.

According to some embodiments the forming the snapshot of the second operating system image comprises snapshotting the incremental operating system update and at least some of the data associated with the snapshot of the first operating system image.

According to some embodiments the method further includes copying user configurations from the first operating system image to the second operating system image according to the first file system on the target device.

According to some embodiments the first file system on the target device is not a snapshot-capable operating system.

According to some embodiments the method further includes maintaining, in the target-device-held series of snapshots the snapshot of the first operating system image and the snapshot of the second operating system image representing pairwise differences between the first operating system image and the second operating system image.

According to some embodiments the storing, in the target device memory the second operating system image includes maintaining data blocks representative of the first operating system image in the first file system on the target device.

According to some embodiments the method further includes determining the success of the boot of the target device using the second operating system image; and on the condition of determining an unsuccessful boot of the target device, booting the target device using the first operating system image.

According to some embodiments the method further includes receiving, during a target device check-in, a notification that the target device is scheduled to receive equivalent data of the snapshot of the second operating system image from a plurality of snapshots of a plurality of operating system images stored on the remote storage device.

According to some embodiments the method further includes transmitting, to the remote storage device, information identifying the operating system version of the first operating system image.

According to some embodiments, a method of updating an operating system on a target device using incremental updates, includes: storing, in a target device first data set a first operating system image; storing, in a target device second data set, a snapshot of the first operating system image comprising a first set of data blocks representing the first operating system image and information pointing to the first set of data blocks; receiving, by the target device and from a remote storage device, data equivalent to a snapshot of a second operating system image, wherein the second operating system image is an image of an updated version of the first operating system image and wherein the data equivalent to a snapshot of the second operating system image includes at least one additional data block representing one or more pairwise differences between the snapshot of the first operating system image and the snapshot of the second operating system image; forming the snapshot of second operating system image from the data equivalent to the snapshot of the second operating system image, wherein the snapshot of the second operating system image comprises at least one of the blocks in the first set of data blocks and the at least one additional data block; storing, in the target device second data set, the snapshot of the second operating system image; exporting, to the target device first data set, a second operating system image containing data representative of the snapshot of the second operating system image; storing, in the target device first data set the second operating system image; and booting the target device using the second operating system image.

According to some embodiments the equivalent data of the snapshot of the second operating system image is an incremental operating system update, and the equivalent data of the snapshot of the second operating system image further comprises information identifying the blocks to be included in the snapshot of the second operating system image.

According to some embodiments the forming the snapshot of the second operating system image comprises snapshotting at least one of the blocks in the first set of data blocks and the at least one additional data block based on the information identifying the blocks to be included in the snapshot of the second operating system image.

According to some embodiments the method further includes copying user configurations from the first operating system image to the second operating system image according to the target device first data set.

According to some embodiments the target device first data set is stored according to a file system that is not a snapshot-capable file system.

According to some embodiments the target device second data set is stored according to a file system that is a snapshot-capable file system.

According to some embodiments the method further includes maintaining, in the target device second data set the snapshot of the first operating system image and the snapshot of the second operating system image.

According to some embodiments the storing, in the target device first data set the second operating system image includes maintaining blocks representative of the first operating system image in the target device first data set.

According to some embodiments the method further includes determining of the boot of the target device using the second operating system image was successful; and on the condition of determining an unsuccessful boot of the target device, booting the target device using the first operating system image.

According to some embodiments the method further includes receiving, during a target device check-in, a notification that the target device is scheduled to receive equivalent data of the snapshot of the second operating system image from a plurality of snapshots of a plurality of operating system images stored on the remote storage device.

According to some embodiments the method further includes transmitting, to the remote storage device, information identifying the operating system version of the first operating system image.

According to some embodiments, a method of updating operating systems on a fleet of target devices using incremental updates, includes: storing, a first operating system image in a first data set on at least one target device of the fleet of target devices; storing, a snapshot of the first operating system image comprising a first set of data blocks representing the first operating system image and information pointing to the first set of data blocks in a second data set on the at least one target device of the fleet of target devices; receiving, by the at least one target device of the fleet of target devices and from a remote storage device, first data equivalent to a snapshot of a second operating system image, wherein the second operating system image is an image of an updated version of the first operating system image and wherein the data equivalent to a snapshot of the second operating system image includes at least one additional data block representing one or more pairwise differences between the snapshot of the first operating system image and the snapshot of the second operating system image; forming the snapshot of second operating system image from the first data equivalent to the snapshot of the second operating system image, wherein the snapshot of the second operating system image comprises at least one of the blocks in the first set of data blocks and the at least one additional data block; storing, in the second data set on the at least one target device of the fleet of target devices, the snapshot of the second operating system image; exporting, to the first data set on the at least one target device of the fleet of target devices, a second operating system image containing data representative of the snapshot of the second operating system image; storing, in the first data set on the at least one target device of the fleet of target devices the second operating system image; and booting the at least one target device of the fleet of target devices using the second operating system image.

According to some embodiments the method further includes storing, a third operating system image in a first data set on at least one other target device of the fleet of target devices; storing, a snapshot of the third operating system image comprising a third set of data blocks representing the third operating system image and information pointing to the first set of data blocks in a second data set on the at least one other target device of the fleet of target devices; receiving, by the at least one other target device of the fleet of target devices and from a remote storage device, second data equivalent to the snapshot of a second operating system image, wherein the second operating system image is an image of an updated version of the third operating system image and wherein the data equivalent to a snapshot of the second operating system image includes at least one other additional data block representing one or more pairwise differences between the snapshot of the third operating system image and the snapshot of the second operating system image; forming the snapshot of second operating system image from the second data equivalent to the snapshot of the second operating system image, wherein the snapshot of the second operating system image comprises at least one of the blocks in the third set of data blocks and the at least one other additional data block; storing, in the second data set on the at least one other target device of the fleet of target devices, the snapshot of the second operating system image; exporting, to the first data set on the at least one other target device of the fleet of target devices, a second operating system image containing data representative of the snapshot of the second operating system image; storing, in the first data set on the at least one other target device of the fleet of target devices the second operating system image; and booting the at least one other target device of the fleet of target devices using the second operating system image.

According to some embodiments at least one of the first equivalent data of the snapshot of the second operating system image and the second equivalent data of the snapshot of the second operating system image is an incremental operating system update, and the at least one of the first equivalent data of the snapshot of the second operating system image and the second equivalent data of the snapshot of the second operating system image further comprises information identifying the blocks to be included in the snapshot of the second operating system image.

According to some embodiments the forming the snapshot of the second operating system image from at least one of from the first data equivalent to the snapshot of the second operating system image and the second data equivalent to the snapshot of the second operating system image comprises snapshotting at least one of the blocks in the first set of data blocks and the at least one additional data block and at least one of the blocks in the third set of data blocks and the at least one other additional data block based on the information identifying the blocks to be included in the snapshot of the second operating system image.

According to some embodiments the method further includes copying user configurations from the first operating system image to the second operating system image according to the first data set on at least one target device.

According to some embodiments the first data set on at least one target device is stored according to a file system that is not a snapshot-capable file system.

According to some embodiments the second data set on the at least one target device is stored according to a file system that is a snapshot-capable file system.

According to some embodiments the method further includes maintaining, in the second data set on the at least one target device the snapshot of the first operating system image and the snapshot of the second operating system image.

According to some embodiments the storing, in the first data set on at least one target device the second operating system image includes maintaining blocks representative of the first operating system image in the first data set on at least one target device.

According to some embodiments the method further includes determining of the boot of the at least one target device using the second operating system image was successful; and on the condition of determining an unsuccessful boot of the at least one target, booting the at least one target using the first operating system image.

According to some embodiments the method further includes receiving, during a check-in for at least one of the at least one target device, a notification that the at least one target device is scheduled to receive first equivalent data of the snapshot of the second operating system image from a plurality of snapshots of a plurality of operating system images stored on the remote storage device.

According to some embodiments the method further includes transmitting, to the remote storage device, information identifying the operating system version of the first operating system image on the at least one target device.

According to some embodiments a system for updating an operating system on a target device using incremental updates, includes: a first file system on the target device in a target device memory configured to store a first operating system image; a receiving node of the target device configured to receive from a remote storage device, data equivalent to a snapshot of a second operating system image, the second operating system image being an image of an updated version of the first operating system image; a snapshot generator configured to receive the data equivalent to a snapshot of a second operating system image and to form the snapshot of second operating system image from the data equivalent to the snapshot of the second operating system image; a second file system on the target device in the target device memory configured to store a snapshot of the first operating system image in a target-device-held series of snapshots, wherein the second file system on the target device snapshot capable and wherein the second file system on the target device is configured to: store the snapshot of the second operating system image in the target-device-held series of snapshots according to the second file system on the target device, and export, to the target device memory, a second operating system image containing data representative of the snapshot of the second operating system image; and wherein the first file system on the target device in the target device is configured to store the second operating system image such that the target device can be booted using the second operating system image.

According to some embodiments the equivalent data of the snapshot of the second operating system image is an incremental operating system update representative of a difference between the snapshot of the first operating system image and the snapshot of the second operating system image.

According to some embodiments the snapshot generator is configured to form the snapshot of the second operating system image by snapshotting the incremental operating system update and at least some of the data associated with the snapshot of the first operating system image.

According to some embodiments the target device is further configured to copy user configurations from the first operating system image in the first file system on the target device to the second operating system image in the first file system on the target device.

According to some embodiments the first file system on the target device is not a snapshot-capable operating system.

According to some embodiments the second file system on the target device is configured to store the snapshot of the first operating system image simultaneously the snapshot of the second operating system image representing pairwise differences between the first operating system image and the second operating system image.

According to some embodiments the first file system on the target device is configured to store data blocks representative of the first operating system image and data blocks representative of the second operating system image.

According to some embodiments the target device is configured to: boot using the second operating system image; determine the success of the boot of the target device using the second operating system image; and on the condition of determining an unsuccessful boot of the target device, boot using the first operating system image.

According to some embodiments a system for updating an operating system on a target device using incremental updates, includes: a target device first data set in a target device memory configured to store a first operating system image; a target device second data set in the target device memory configured to store a snapshot of the first operating system image comprising a first set of data blocks representing the first operating system image and information pointing to the first set of data blocks; a receiving node of the target device configured to receive, data equivalent to a snapshot of a second operating system image from a remote storage device, wherein the second operating system image is an image of an updated version of the first operating system image and wherein the data equivalent to a snapshot of the second operating system image includes at least one additional data block representing one or more pairwise differences between the snapshot of the first operating system image and the snapshot of the second operating system image; and a snapshot generator configured to receive the data equivalent to a snapshot of a second operating system image and to form the snapshot of second operating system image from the data equivalent to the snapshot of the second operating system image, wherein the snapshot of the second operating system image comprises at least one of the blocks in the first set of data blocks and the at least one additional data block; and the target device is configured to: store, in the target device second data set, the snapshot of the second operating system image, export, to the target device first data set, a second operating system image containing data representative of the snapshot of the second operating system image, store, in the target device first data set the second operating system image, and boot the target device using the second operating system image.

According to some embodiments the equivalent data of the snapshot of the second operating system image is an incremental operating system update, and the equivalent data of the snapshot of the second operating system image further comprises information identifying the blocks to be included in the snapshot of the second operating system image.

According to some embodiments the snapshot generator is configured to form the snapshot of the second operating system image by snapshotting at least one of the blocks in the first set of data blocks and the at least one additional data block based on the information identifying the blocks to be included in the snapshot of the second operating system image.

According to some embodiments the target device is further configured to copy user configurations from the first operating system image in the target device first data set to the second operating system image in the target device first data set.

According to some embodiments the target device first data set is stored according to a file system that is not a snapshot-capable file system.

According to some embodiments the target device second data set is stored according to a file system that is a snapshot-capable file system.

According to some embodiments the target device is configured to store the snapshot of the first operating system image and the snapshot of the second operating system image in the target device second data set.

According to some embodiments the target device is further configured to store the second operating system image and the first operating system image in the target device first data set.

According to some embodiments the target device is configured to: boot using the second operating system image; determine the success of the boot of the target device using the second operating system image; and on the condition of determining an unsuccessful boot of the target device, boot using the first operating system image.

According to some embodiments fleet of target devices includes: a first target device comprising: a first target device first data set in a first target device memory configured to store a first operating system image; a first target device second data set in the first target device memory configured to store a snapshot of the first operating system image comprising a first set of data blocks representing the first operating system image and information pointing to the first set of data blocks; a first receiving node of the first target device configured to receive first data equivalent to a snapshot of a second operating system image from a remote storage device, wherein the second operating system image is an image of an updated version of the first operating system image and wherein the data equivalent to a snapshot of the second operating system image includes at least one first additional data block representing one or more first pairwise differences between the snapshot of the first operating system image and the snapshot of the second operating system image; a first snapshot generator of the first target device configured to receive the first data equivalent to a snapshot of a second operating system image and to form the snapshot of second operating system image from the first data equivalent to the snapshot of the second operating system image, wherein the snapshot of the second operating system image comprises at least one of the blocks in the first set of data blocks and the at least one first additional data block, and the first target device is configured to: store, in the first target device second data set, the snapshot of the second operating system image, export, to the first target device first data set, a second operating system image containing first data representative of the snapshot of the second operating system image, store, in the first target device first data set the second operating system image, and boot the first target device using the second operating system image; and a second target device comprising: a second target device first data set in a second target device memory configured to store a third operating system image; a second target device second data set in the second target device memory configured to store a snapshot of the first operating system image comprising a third set of data blocks representing the third operating system image and information pointing to the second set of data blocks; a second receiving node of the second target device configured to receive second data equivalent to a snapshot of a second operating system image from a remote storage device, wherein the second operating system image is an image of an updated version of the third operating system image and wherein the second data equivalent to a snapshot of the second operating system image includes at least one other additional data block representing one or more second pairwise differences between the snapshot of the third operating system image and the snapshot of the second operating system image; and a second snapshot generator of the second target device configured to receive the first data equivalent to a snapshot of a second operating system image and to form the snapshot of second operating system image from the first data equivalent to the snapshot of the second operating system image, wherein the snapshot of the second operating system image comprises at least one of the blocks in the third set of data blocks and the at least one other additional data block, and the second target device is configured to: store, in the second target device second data set, the snapshot of the second operating system image, export, to the second target device first data set, a second operating system image containing second data representative of the snapshot of the second operating system image, store, in the second target device first data set the second operating system image, and boot the second target device using the second operating system image.

According to some embodiments at least one of the first equivalent data of the snapshot of the second operating system image and the second equivalent data of the snapshot of the second operating system image is an incremental operating system update, and the at least one of the first equivalent data of the snapshot of the second operating system image and the second equivalent data of the snapshot of the second operating system image further comprises information identifying the blocks to be included in the snapshot of the second operating system image.

According to some embodiments at least one of the first snapshot generator and the second snapshot generator is configured to snapshot at least one of the blocks in the first set of data blocks and the at least one additional data block or at least one of the blocks in the third set of data blocks and the at least one other additional data block, respectively based on the information identifying the blocks to be included in the snapshot of the second operating system image.

According to some embodiments the first target device is configured to copy user configurations from the first operating system image to the second operating system image according to the first data set on at least one first target device.

According to some embodiments the first data set on the first target device is stored according to a file system that is not a snapshot-capable file system.

According to some embodiments the second data set on the first least one target device is stored according to a file system that is a snapshot-capable file system.

According to some embodiments a computer readable storage medium stores instructions that upon execution causes a processor to perform the following steps: store, in a target device memory a first operating system image according to a first file system on the target device; store, in the target device memory, a snapshot of the first operating system image in a target-device-held series of snapshots according to a second file system on the target device that is snapshot capable; receive, by the target device and from a remote storage device, data equivalent to a snapshot of a second operating system image, the second operating system image being an image of an updated version of the first operating system image; form the snapshot of second operating system image from the data equivalent to the snapshot of the second operating system image; store, in the target device, the snapshot of the second operating system image in the target-device-held series of snapshots according to the second file system on the target device; export, to the target device memory, a second operating system image containing data representative of the snapshot of the second operating system image; store, in the target device memory the second operating system image according to the first file system on the target device; and boot the target device using the second operating system image.

According to some embodiments the equivalent data of the snapshot of the second operating system image is an incremental operating system update representative of a difference between the snapshot of the first operating system image and the snapshot of the second operating system image.

According to some embodiments the instructions further cause the processor to form the snapshot of the second operating system image comprises snapshotting the incremental operating system update and at least some of the data associated with the snapshot of the first operating system image.

According to some embodiments the instructions further cause the processor to copy user configurations from the first operating system image to the second operating system image according to the first file system on the target device.

According to some embodiments the first file system on the target device is not a snapshot-capable operating system.

According to some embodiments the instructions further cause the processor to maintain, in the target-device-held series of snapshots the snapshot of the first operating system image and the snapshot of the second operating system image representing pairwise differences between the first operating system image and the second operating system image.

According to some embodiments the instructions further cause the processor to store, in the target device memory the second operating system image includes maintaining data blocks representative of the first operating system image in the first file system on the target device.

According to some embodiments the instructions further cause the processor to: determine the success of the boot of the target device using the second operating system image; and son the condition of determining an unsuccessful boot of the target device, boot the target device using the first operating system image.

According to some embodiments the instructions further cause the processor to receive, during a target device check-in, a notification that the target device is scheduled to receive equivalent data of the snapshot of the second operating system image from a plurality of snapshots of a plurality of operating system images stored on the remote storage device.

According to some embodiments the instructions further cause the processor to transmit, to the remote storage device, information identifying the operating system version of the first operating system image.

According to some embodiments a computer readable storage medium stores instructions that upon execution causes a processor to perform the following steps: store, in a target device first data set a first operating system image; store, in a target device second data set, a snapshot of the first operating system image comprising a first set of data blocks representing the first operating system image and information pointing to the first set of data blocks; receive, by the target device and from a remote storage device, data equivalent to a snapshot of a second operating system image, wherein the second operating system image is an image of an updated version of the first operating system image and wherein the data equivalent to a snapshot of the second operating system image includes at least one additional data block representing one or more pairwise differences between the snapshot of the first operating system image and the snapshot of the second operating system image; form the snapshot of second operating system image from the data equivalent to the snapshot of the second operating system image, wherein the snapshot of the second operating system image comprises at least one of the blocks in the first set of data blocks and the at least one additional data block; store, in the target device second data set, the snapshot of the second operating system image; export, to the target device first data set, a second operating system image containing data representative of the snapshot of the second operating system image; store, in the target device first data set the second operating system image; and boot the target device using the second operating system image.

According to some embodiments the equivalent data of the snapshot of the second operating system image is an incremental operating system update, and the equivalent data of the snapshot of the second operating system image further comprises information identifying the blocks to be included in the snapshot of the second operating system image.

According to some embodiments the instructions further cause the processor to form the snapshot of the second operating system image comprises snapshotting at least one of the blocks in the first set of data blocks and the at least one additional data block based on the information identifying the blocks to be included in the snapshot of the second operating system image.

According to some embodiments the instructions further cause the processor to copy user configurations from the first operating system image to the second operating system image according to the target device first data set.

According to some embodiments the target device first data set is stored according to a file system that is not a snapshot-capable file system.

According to some embodiments the target device second data set is stored according to a file system that is a snapshot-capable file system.

According to some embodiments the instructions further cause the processor to maintain, in the target device second data set the snapshot of the first operating system image and the snapshot of the second operating system image.

According to some embodiments the instructions further cause the processor to store, in the target device first data set the second operating system image includes maintaining blocks representative of the first operating system image in the target device first data set.

According to some embodiments the instructions further cause the processor to: determine of the boot of the target device using the second operating system image was successful; and on the condition of determining an unsuccessful boot of the target device, boot the target device using the first operating system image.

According to some embodiments the instructions further cause the processor to receive, during a target device check-in, a notification that the target device is scheduled to receive equivalent data of the snapshot of the second operating system image from a plurality of snapshots of a plurality of operating system images stored on the remote storage device.

According to some embodiments the instructions further cause the processor to transmit, to the remote storage device, information identifying the operating system version of the first operating system image.

According to some embodiments a computer readable storage medium stores instructions that upon execution causes a processor to perform the following steps: store, a first operating system image in a first data set on at least one target device of the fleet of target devices; store, a snapshot of the first operating system image comprising a first set of data blocks representing the first operating system image and information pointing to the first set of data blocks in a second data set on the at least one target device of the fleet of target devices; receive, by the at least one target device of the fleet of target devices and from a remote storage device, first data equivalent to a snapshot of a second operating system image, wherein the second operating system image is an image of an updated version of the first operating system image and wherein the data equivalent to a snapshot of the second operating system image includes at least one additional data block representing one or more pairwise differences between the snapshot of the first operating system image and the snapshot of the second operating system image; form the snapshot of second operating system image from the first data equivalent to the snapshot of the second operating system image, wherein the snapshot of the second operating system image comprises at least one of the blocks in the first set of data blocks and the at least one additional data block; store, in the second data set on the at least one target device of the fleet of target devices, the snapshot of the second operating system image; export, to the first data set on the at least one target device of the fleet of target devices, a second operating system image containing data representative of the snapshot of the second operating system image; store, in the first data set on the at least one target device of the fleet of target devices the second operating system image; and boot the at least one target device of the fleet of target devices using the second operating system image.

According to some embodiments the instructions further cause the processor to: store, a third operating system image in a first data set on at least one other target device of the fleet of target devices; store, a snapshot of the third operating system image comprising a third set of data blocks representing the third operating system image and information pointing to the first set of data blocks in a second data set on the at least one other target device of the fleet of target devices; receive, by the at least one other target device of the fleet of target devices and from a remote storage device, second data equivalent to the snapshot of a second operating system image, wherein the second operating system image is an image of an updated version of the third operating system image and wherein the data equivalent to a snapshot of the second operating system image includes at least one other additional data block representing one or more pairwise differences between the snapshot of the third operating system image and the snapshot of the second operating system image; form the snapshot of second operating system image from the second data equivalent to the snapshot of the second operating system image, wherein the snapshot of the second operating system image comprises at least one of the blocks in the third set of data blocks and the at least one other additional data block; store, in the second data set on the at least one other target device of the fleet of target devices, the snapshot of the second operating system image; export, to the first data set on the at least one other target device of the fleet of target devices, a second operating system image containing data representative of the snapshot of the second operating system image; store, in the first data set on the at least one other target device of the fleet of target devices the second operating system image; and booting the at least one other target device of the fleet of target devices using the second operating system image.

According to some embodiments at least one of the first equivalent data of the snapshot of the second operating system image and the second equivalent data of the snapshot of the second operating system image is an incremental operating system update, and the at least one of the first equivalent data of the snapshot of the second operating system image and the second equivalent data of the snapshot of the second operating system image further comprises information identifying the blocks to be included in the snapshot of the second operating system image.

According to some embodiments the instructions further cause the processor to form the snapshot of the second operating system image from at least one of from the first data equivalent to the snapshot of the second operating system image and the second data equivalent to the snapshot of the second operating system image comprises snapshotting at least one of the blocks in the first set of data blocks and the at least one additional data block and at least one of the blocks in the third set of data blocks and the at least one other additional data block based on the information identifying the blocks to be included in the snapshot of the second operating system image.

According to some embodiments the instructions further cause the processor to copy user configurations from the first operating system image to the second operating system image according to the first data set on at least one target device.

According to some embodiments the first data set on at least one target device is stored according to a file system that is not a snapshot-capable file system.

According to some embodiments the second data set on the at least one target device is stored according to a file system that is a snapshot-capable file system.

According to some embodiments the instructions further cause the processor to maintain, in the second data set on the at least one target device the snapshot of the first operating system image and the snapshot of the second operating system image.

According to some embodiments the instructions further cause the processor to store, in the first data set on at least one target device the second operating system image includes maintaining blocks representative of the first operating system image in the first data set on at least one target device.

According to some embodiments the instructions further cause the processor to: determine of the boot of the at least one target device using the second operating system image was successful; and on the condition of determining an unsuccessful boot of the at least one target, boot the at least one target using the first operating system image.

According to some embodiments the instructions further cause the processor to receive, during a check-in for at least one of the at least one target device, a notification that the at least one target device is scheduled to receive first equivalent data of the snapshot of the second operating system image from a plurality of snapshots of a plurality of operating system images stored on the remote storage device.

According to some embodiments the instructions further cause the processor to transmit, to the remote storage device, information identifying the operating system version of the first operating system image on the at least one target device.

BRIEF DESCRIPTION OF THE DRAWINGS

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

FIGS. 5A-5K show an exemplary target device OS data drive, according to some embodiments.

DETAILED DESCRIPTION

Figure 1A:
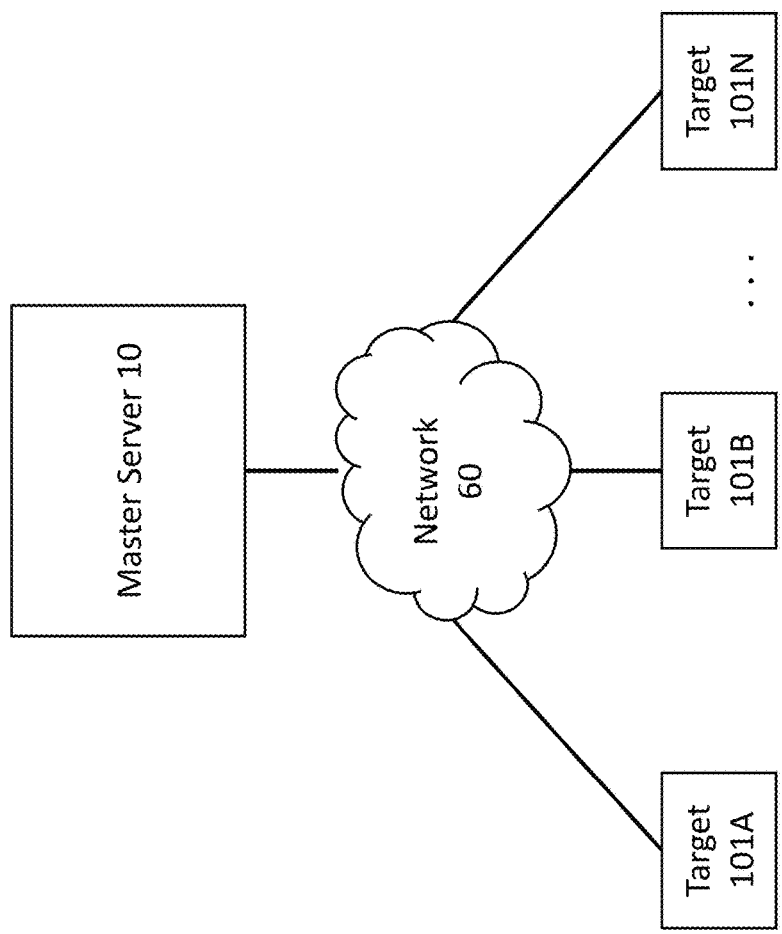
FIGS. 1A-1B show exemplary systems with target devices requiring updates, according to some embodiments.

In the following description, numerous specific details are set forth regarding the systems, methods, and media of the disclosed subject matter and the environment in which such systems, methods, and media may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems, methods and media that are within the scope of the disclosed subject matter.

Disclosed systems, methods, and computer readable media provide for efficiently transmitting, building, receiving, and implementing an image-based update using snapshot increments. According to some embodiments, a target device operating on a first operating system can receive an incremental update for a second operating system and store a snapshot of the second operating system based on the incremental update in a first data set along with a snapshot of the first operating system. The target device may then export an image of the second operating system to a second data set and boot into the second image. Accordingly, the target device may quickly and efficiently receive operating system updates, build operating system images in the background, and boot into the updated operating system when the process is complete. Additionally, storing snapshots of the incremental updates and previous operating system images allows for easy reversion to old operating systems without requiring storage of many full operating system images on the target device. Furthermore, the systems and methods descried herein provide for fast, efficient, and reliable updating of large fleets of remote devices, such as backup business continuity and disaster recovery (BCDR) devices.

According to some embodiments, a target device may have easy access to both a new and a previously used operating systems by building progressive increments. For example, the disclosed system and methods may include storing a series of snapshots in a first data set. These snapshots may be built based on information received from a remote location, such as a master server. The information may include incremental update data created from file-based differences between a pair of update images held on the master server and may be formatted as block-based differences from the file-based differences. A new operating system image may be created from the block-based differences and a previous operating system image stored in the first data set. The new operating system may be exported to a second data set, and the target device may be booted with the new operating system image so that the target device operates with the new operating system. According to some embodiments, the systems and methods disclosed create a series of operating system images, store operating system images using incremental file-level changes by a server, generate on-demand block-level changes between operating system images by a server, download by a target device incremental changes and apply them to a previous downloaded operating system image, and export the entire operating system image to an OS drive and reboots into the new operating system.

FIG. 1A shows an exemplary system having a set of target devices for receiving and implementing updates according, according to some embodiments. As shown in FIG. 1A, the system includes a master server 10 connected to target devices 101A, 101B, . . . 101N through network 60. Target devices 101A, 101B, . . . 101N may be any type of computing devices, such as, but not limited to BCDR devices, Internet of Things (IoT) devices, personal computing devices, motor vehicle control units, or mobile devices. Target devices 101A, 101B, . . . 101N may be of the same type or of different types. According to some embodiments, target devices 101A, 101B, . . . 101N may be part of a fleet of two or more devices, such as many devices having varied types and software running thereon. Network 60 may be any known network, such as, but not limited to, a wireless network, the Internet, a local access network, a telecommunications network, a Bluetooth connection, or any other known network or a combination of networks. Master server 10 and target devices 101A, 101B, . . . 101N may live in the same or separate clouds. As described in more detail with reference to FIGS. 2A-2B, master server 10 may receive operating system updates and apply those updates to some or all of target devices 101A, 101B, . . . 101N that require an update.

Figure 1B:
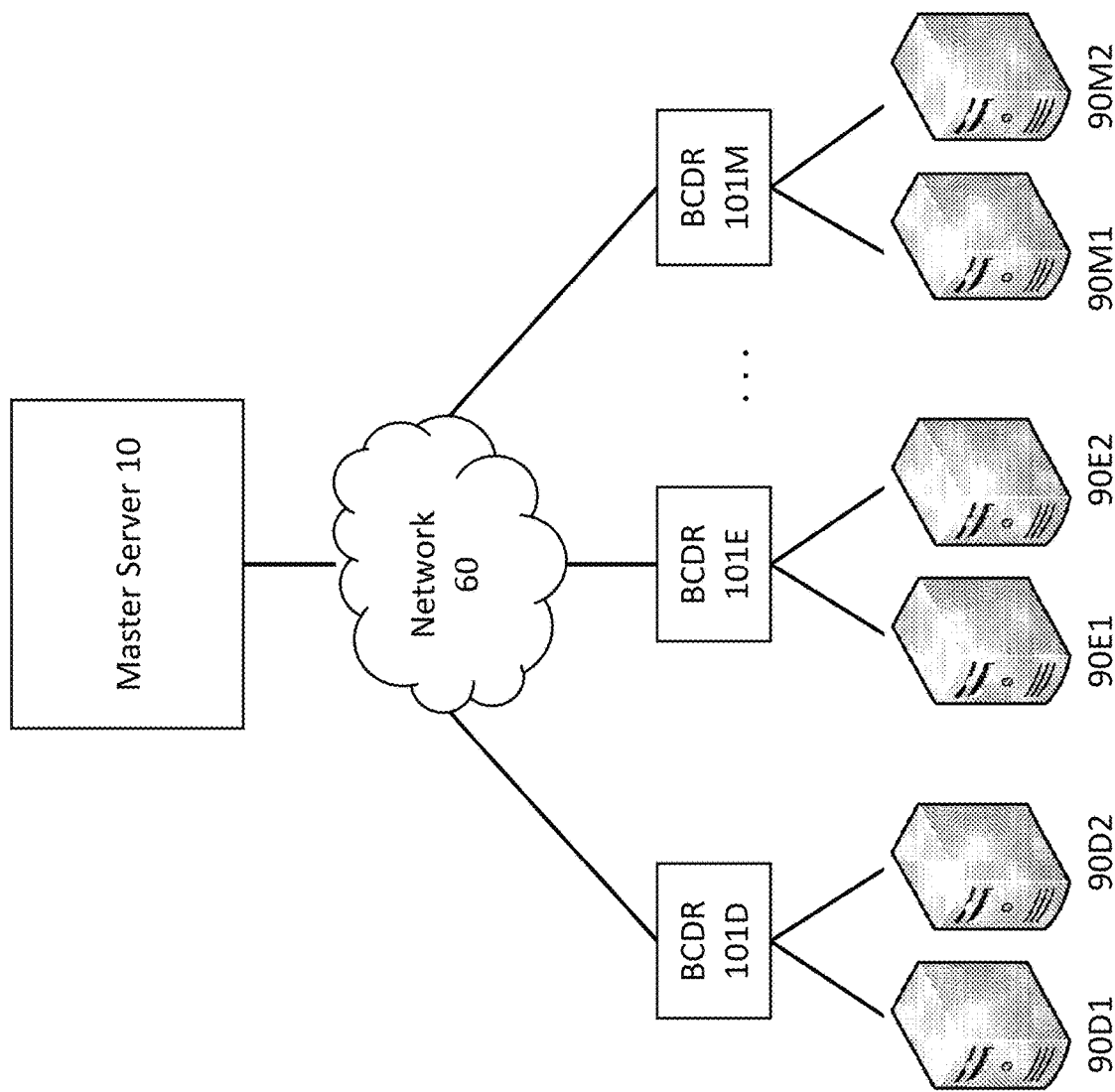

FIG. 1B shows an exemplary system having a set of BCDR target devices, according to some embodiments. Similar to FIG. 1A, a master server communicates with remote devices over a network 60. As shown in FIG. 1B, the target devices 101A, 101B, . . . 101N of FIG. 1 are BCDR target devices 101D, 101E, . . . 101M. BCDR target devices may be, for example, any data backup appliance. Each of BCDR target devices 101D, 101E, . . . 101M is associated with at least one client computing device 90A1-90M2. Although FIG. 1B shows each of BCDR target devices 101D, 101E, . . . 101M being associated with two target computing devices, more or fewer associated client computing devices are contemplated. BCDR target devices 101D, 101E, . . . 101M regularly back up data in the hard drives of client computing devices 90A1-90M2. Furthermore, BCDR target devices 101D, 101E, . . . 101M may allow for immediate recovery of client computing devices 90A1-90M2 using back up data. Similar to FIG. 1A, master server 10 may send updates to BCDR target devices 101D, 101E, . . . 101M as described in more detail below. Once BCDR target devices 101D, 101E, . . . 101M are put to use, it becomes very difficult to make changes to many devices and ensure that updates reach each device. Furthermore, releases being used by each device may vary, making it difficult to determine which updates are to be sent to each device. Remedying these problems while maintaining consistency can be accomplished using the methods and systems described in the present disclosure. Thus, each BCDR target device may be maintained with a current release of software without the need for sending large amounts of data over the network 60 or consuming too much memory on the BCDR target devices or operational resources during updating. Although the present disclosure discusses updating an operating system on target devices, the methods and systems disclosed in the present invention are applicable to any type of software such as, but not limited to operating systems, firmware, or applications.

Figure 2A:
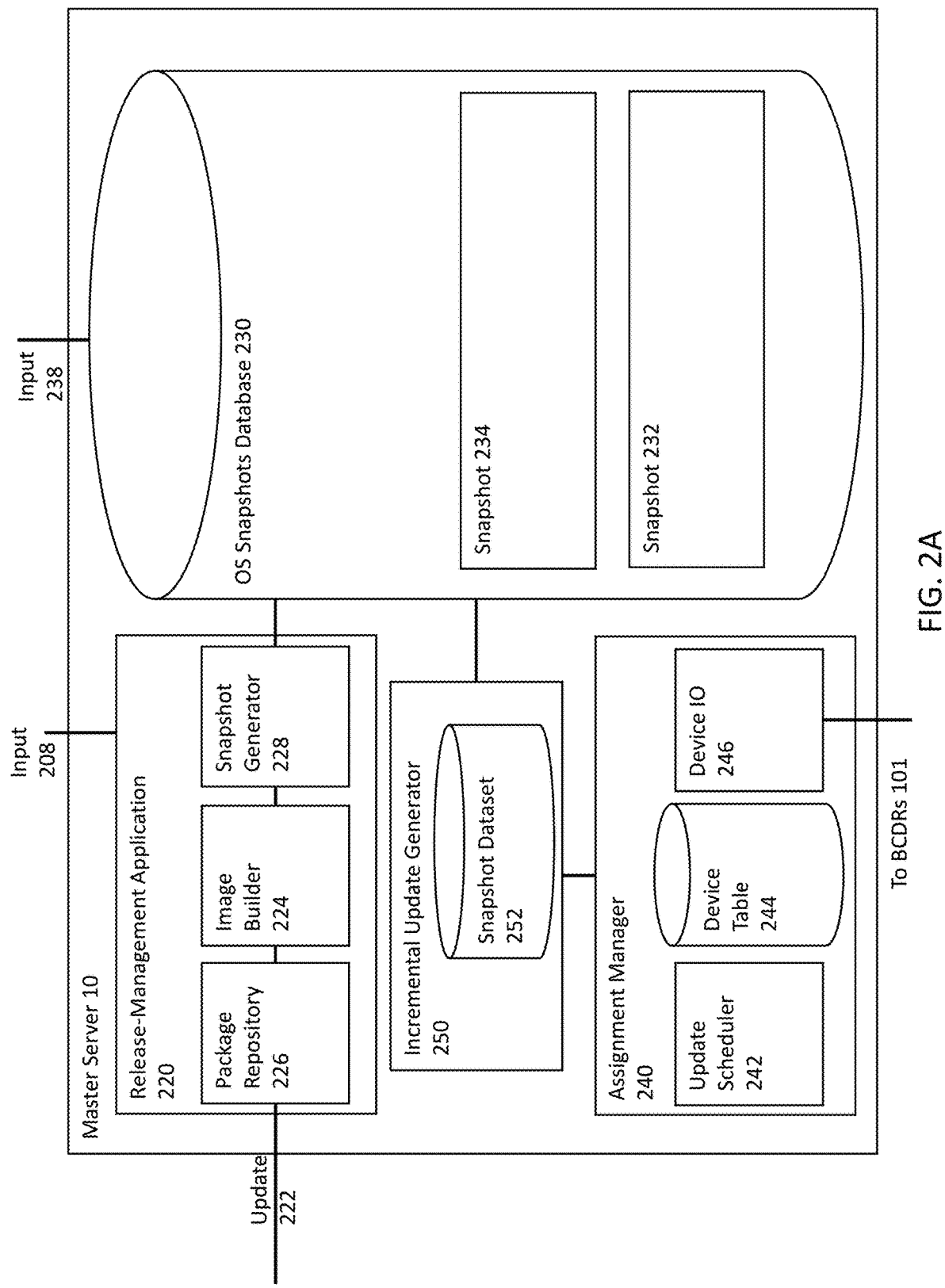
FIGS. 2A-2B show an exemplary master server, according to some embodiments.
Figure 2B:
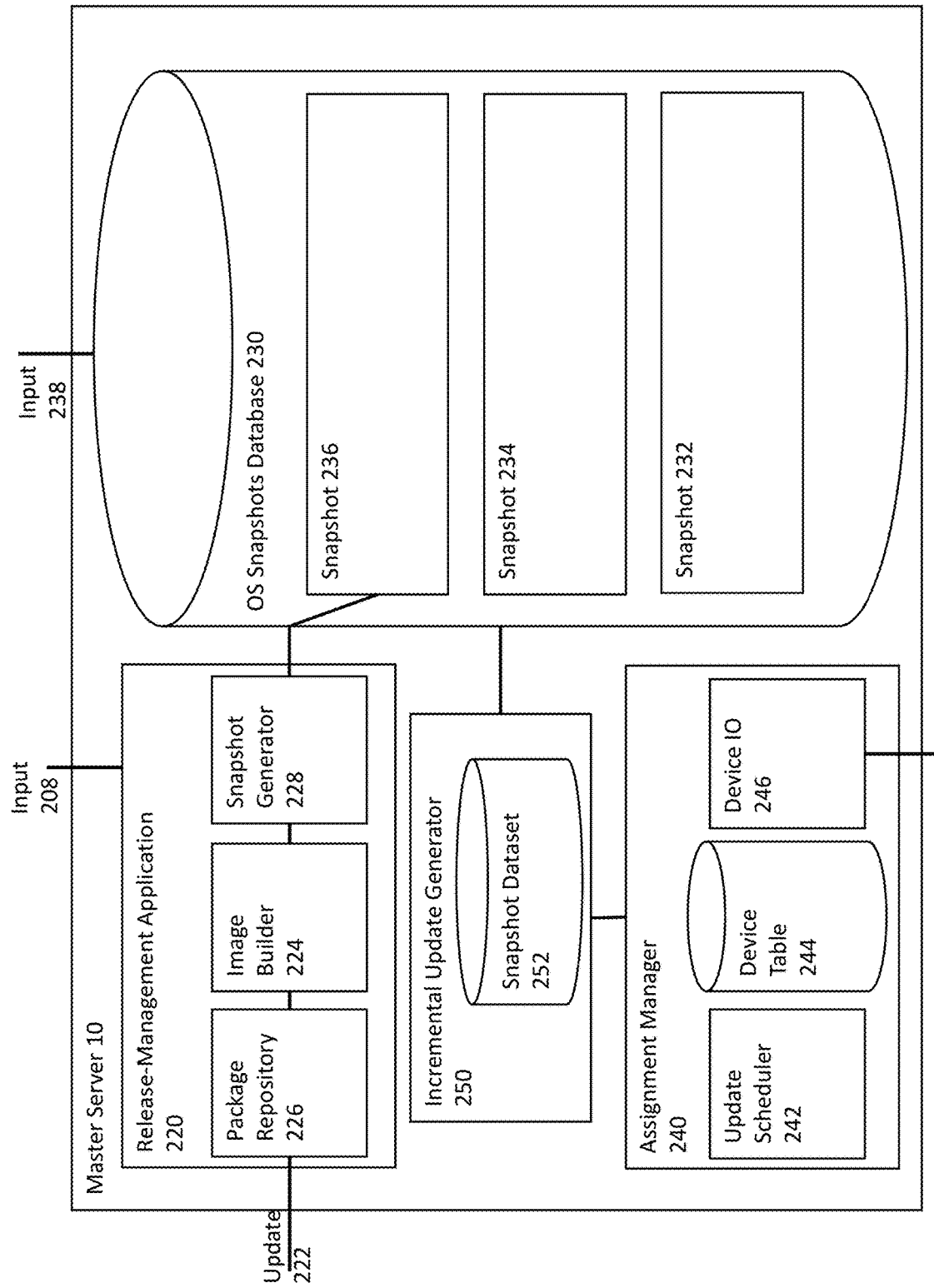

FIG. 2A shows a master server according to some embodiments. Master server 10 contains a Release-Management Application (RMA) 220, a series of operating system snapshot database 230, an assignment manager 240, and an Incremental Update Generator (IUG) 250 that stores snapshots of each image contained from the OS images database 230 in snapshot database 252. RMA 220 is configured to receive an update 222 to an operating system and form a snapshot of an image of the updated operating system for storage in OS snapshot database 230. The operating system to be updated may be an operating system contained on or suited for one of target devices 101A, 101B, . . . 101N or BCDR devices 101D, 101E, . . . 101M shown in FIGS. 1A-1B (collectively referred to as target devices). Image builder 224 of the RMA 220 may receive the update 222 and builds an image of the new operating system based on update 222. Image builder 224 may comprise a task manager, such as a Jenkins worker, that runs image building code. According to some embodiments, a release manager, such as a system operator, may trigger retrieval of the update 222 (for example, using input 208), which may be raw code. The retrieval of update 222 may be automatically initiated without input from a release manager. According to some embodiments, the update 222 may be stored in a pool of packages 226, and the image builder 224 of RMA 220 may combine a number of the stored software packages to form a single image in order to construct desired operating system files. The package selection and image building may be directed by a release manager via input 208. As shown in FIG. 2B, image builder 224 outputs the constructed image to snapshot generator 222. Snapshot generator 222 snapshots the image from image builder 224 to form snapshot 236, and outputs the snapshot 236 and an associated ID tag to operating system snapshot database 230. According to some embodiments, OS snapshot database 230 may store only blocks from snapshot 236 that are different from the previous snapshot 234. According to some embodiments, the OS snapshot database 230 stores snapshots as a ZFS data set According to some embodiments, OS images database 230 maintains a set of operating system snapshots 232, 234, 236 built by image builder 224 and snapshotted by snapshot generator 222. A system operator may mark images as ready to be assigned to target devices via input 238, for example, after testing the reliability and functionality of the operating system contained in each image represented by the snapshots. Each ID tag associated with operating system snapshots 232, 234, 236 may correspond to an operating system version.

Assignment manager 240 maintains a device table 244 populated with records corresponding to target devices. According to some embodiments, the device table 244 may store and maintain records for target devices that contain information on the current operating system release and a target (desired) release. Target devices not requiring an update may have target release values set to zero, according to some embodiments, to signify that no update is available. Update scheduler 242 may receive information based on operating system images that are ready for assignment to target devices and update the device table 244 with target releases. The update scheduler 242 may select target devices, for example at random or based on a desired order or user input, and coordinate updates. For example, a target device may communicate with update scheduler 242 through device input/output (TO) 246. A device may check in with update scheduler 242 and ask if an update is available. Update scheduler may consult device table 244 to determine if an update is required. If the target release is set to a non-zero value, the update scheduler may provide the target device with information identifying the appropriate release to which to update.

When a new image is created, IUG 250 may compare the selected snapshot corresponding to a target release to a previous snapshot corresponding the different release, such as one currently contained on a target device, to determine changes between the two snapshots. For example, IUG 250 may compare snapshot 236 with snapshot 234 to identify block-level differences between the two snapshots. IUG 250 may store the changed files in snapshot dataset 252 along with a snapshot ID pointing to the changed blocks. According to some embodiments, the snapshot dataset 252 is stored as a ZFS data set. The new snapshot captures and stores block-level changes between snapshots of operating system images. Accordingly, snapshot database 252 only stores blocks corresponding to the differences between pairs of operating system images. As discussed in more detail below, some of these snapshots may already be contained on the target devices. In order to update a target device, only data representing the new snapshot, such as the block-level differences can be sent to the target device.

When it is determined that a target device checked in with update scheduler 242 requires an operating system update, update scheduler 242 obtains a file representative of the block-level differences between the target device's current operating system release and the target (desired) release. According to some embodiments, update scheduler 242 then compresses the file, and send an update package to the target device via device IO 246. Since snapshot dataset 252 can store block-level differences between a number of different snapshots, for example between snapshots 234 and 236, between snapshots 232 and 236, and between snapshots 234 and 236, target devices may be updated from a number of different operating system releases to other operating system releases. According to some embodiments, the snapshot dataset 252 may include backward differences between two snapshots that may be used to revert a target device back to an older operating system release that is not stored on the target device.

FIGS. 3A-3E show a target device 101, according to some embodiments. Target device 101 may be any device operating on an operating system for which updates may be supplied according to the system and methods described herein. For example, target device 101 may be a BCDR, such as one of BCDRs 101D, 101E, . . . 101M. According to other embodiments, target device 101 may be any computing device, such as, but not limited to an Internet of Things (IoT) device, a personal computing device, a motor vehicle control unit, or a mobile device.

Figure 3A:
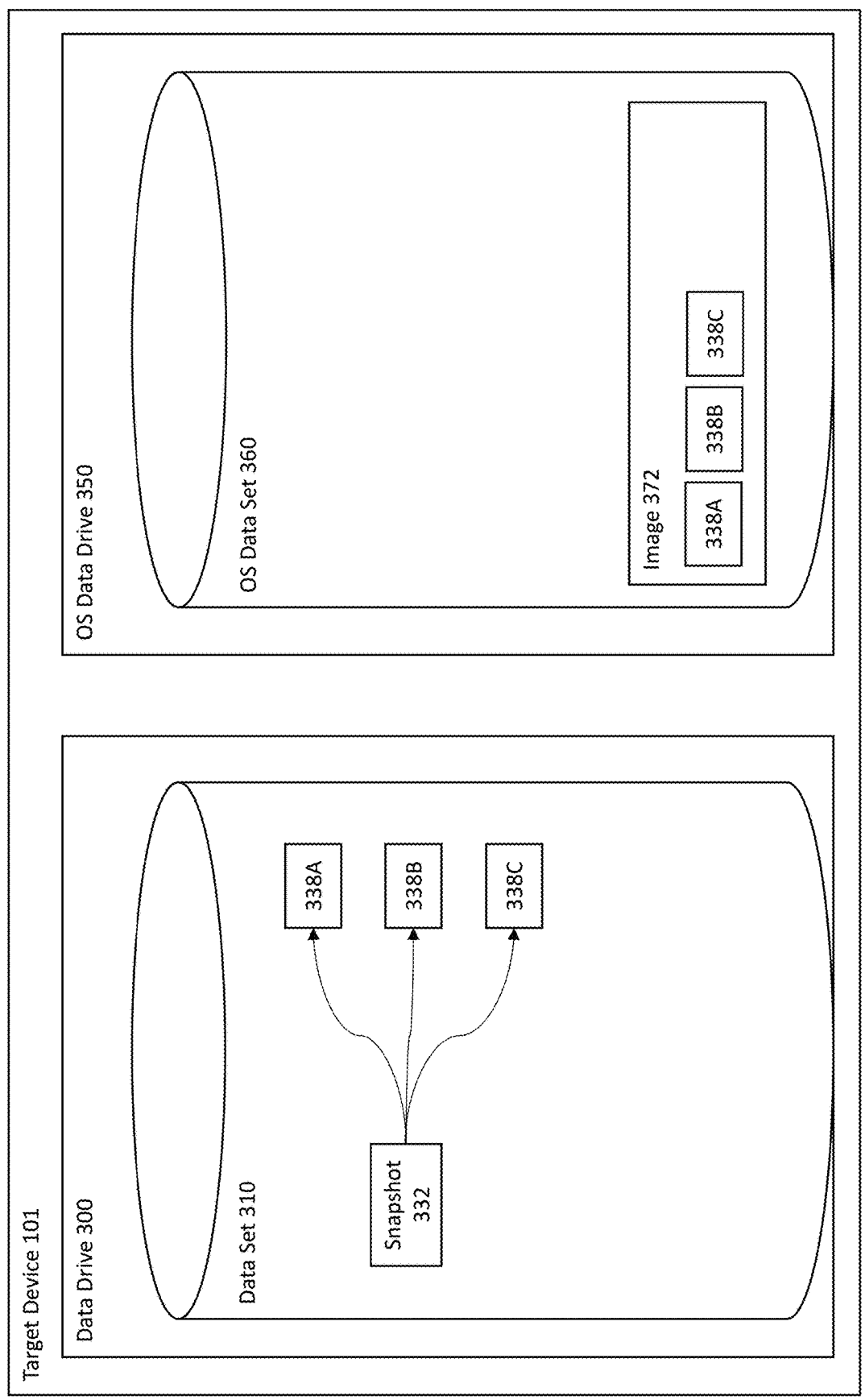
FIGS. 3A-3E show an exemplary target device receiving and implementing updates, according to some embodiments.

As shown in FIG. 3A, target device 101 has data drive 300 and operating system (OS) data drive 350, having a data set 310 and an OS data set 360, respectively. According to some embodiments, data drive 300 and OS data drive 350 may be separate partitions of the same drive or separate drives. According to other embodiments, data drive 300 and OS data drive 350 may be the same drive having two different data sets 310 and 360.

Figure 4A:
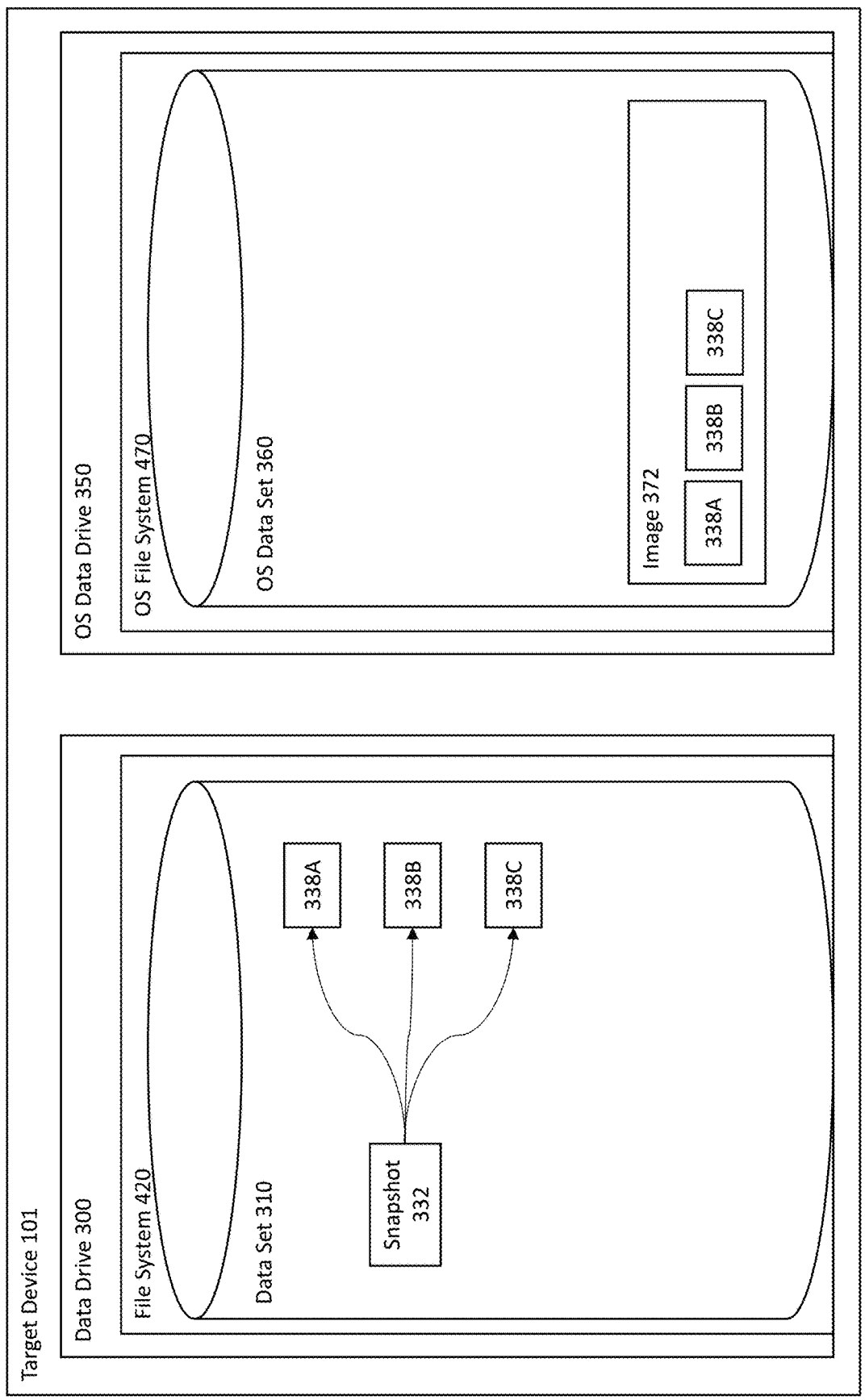
FIGS. 4A-4C show an exemplary target device OS data drive, according to some embodiments.
Figure 4B:
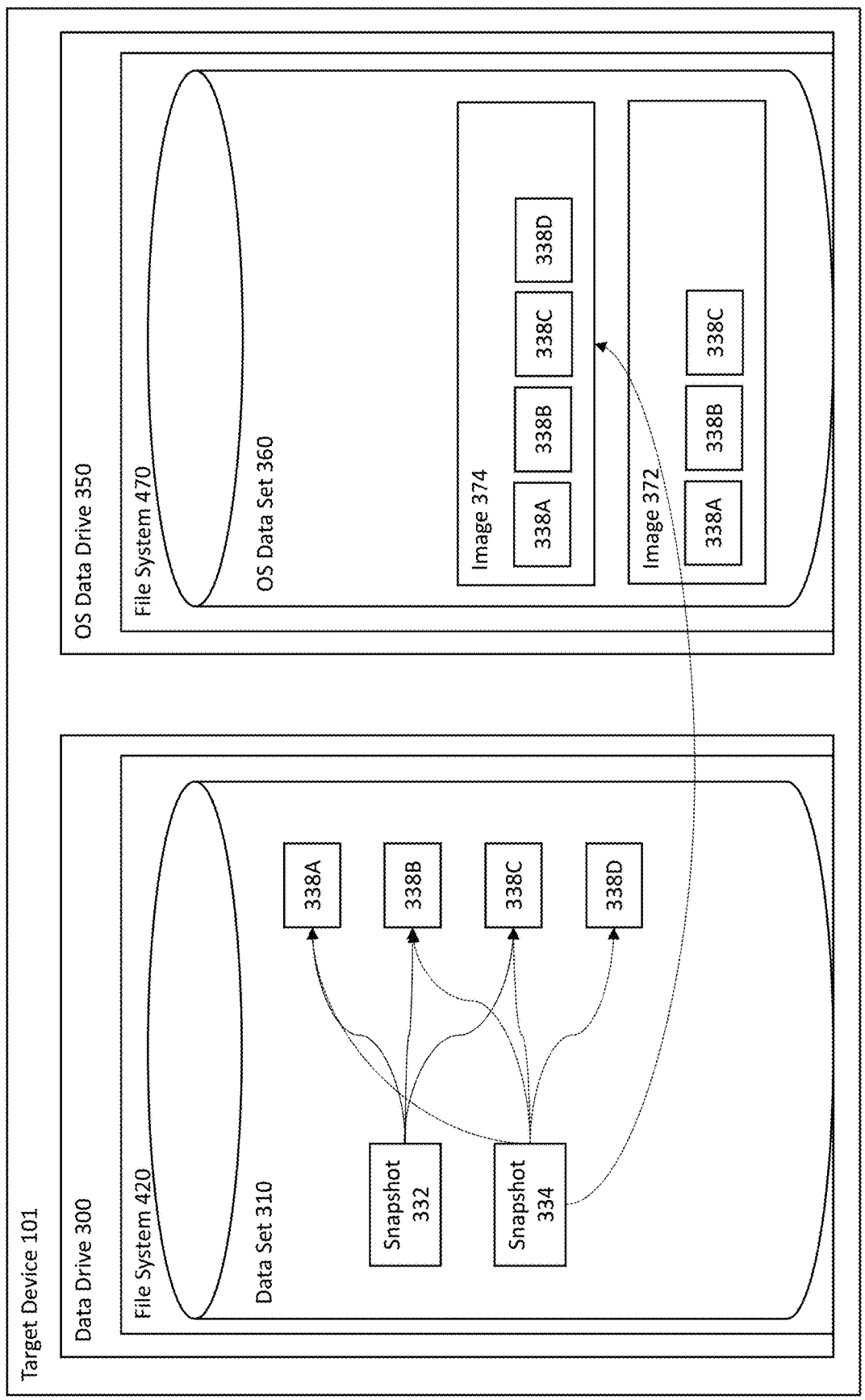
Figure 4C:
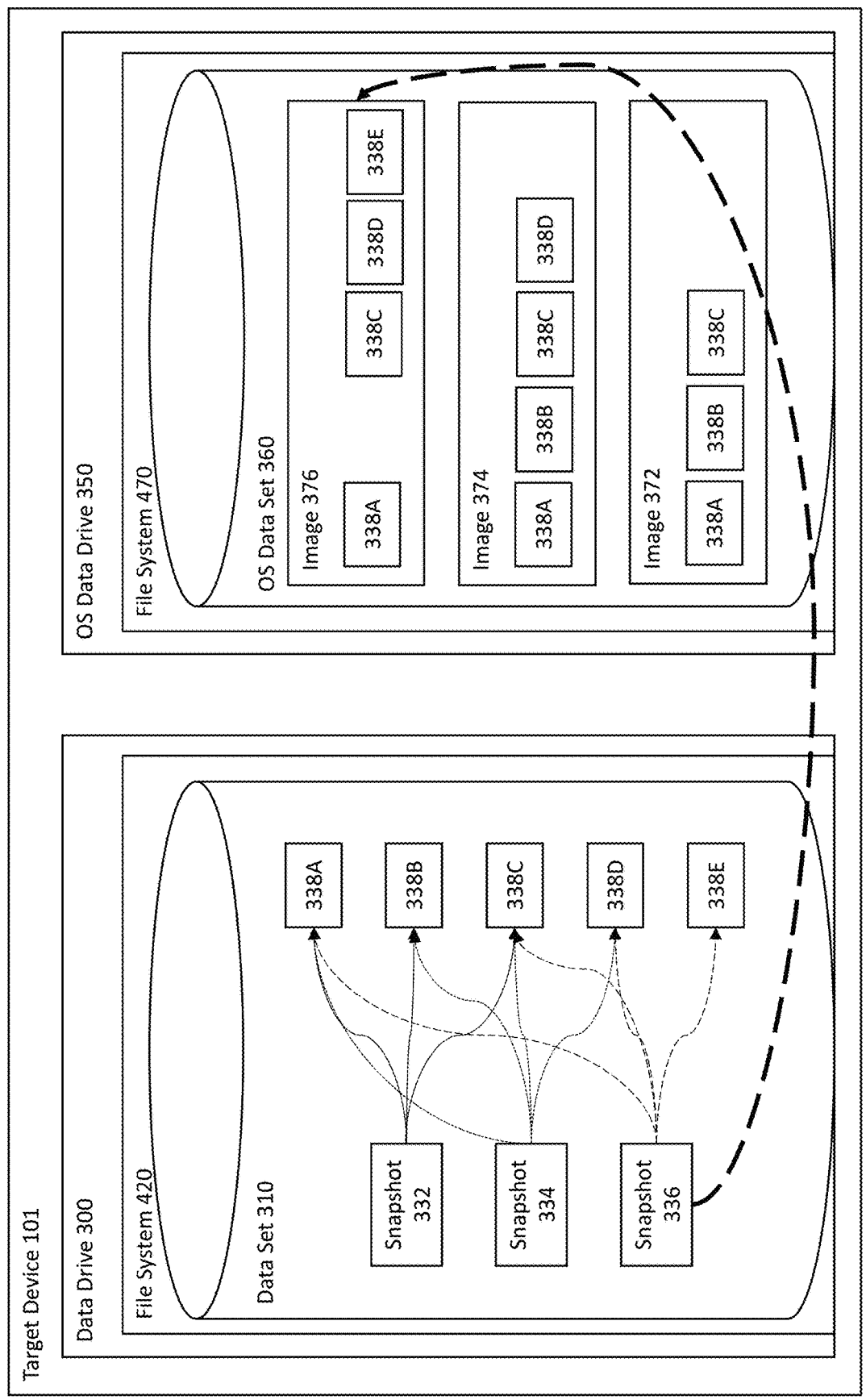

Data drive 300 may operate using a snapshotting file system, for example, using file system 420 shown in FIGS. 4A-4C. The file system 420 may be a ZFS file system. Other file systems and mechanisms for snapshotting can include or relate to Hammer, ReFS, Btrfs, Write Anywhere File Layout (WAFL), fossil, ODS-5, Unix File System 2 (UFSs), Volume Shadow-copying Service (VSS), Shadow Copy, Melio FS, Novell Storage Services (NSS) file system, file systems of EMC's Isilon OneFS clustered storage platform, Oracle Cluster File System 2 (OCFS2), Journaled File System 2 (JFS2), and/or any other suitable file system or mechanism for snapshotting. Accordingly, data drive may contain a data set 310 containing snapshots of operating system images as described in more detail below. In some embodiments, the snapshot can be a block-based snapshot. In some embodiments, the snapshot can be captured by a software agent, such as an agent running on a computing device. In some embodiments, the snapshot can be captured by an operating system and/or a virtual operating platform, such as a hypervisor acquiring a snapshot of the state of a virtual machine. While the present disclosure intends to cover all embodiments of snapshot acquiring mechanisms, to aid in clarity of the description, the present disclosure may simply describe that the snapshot is acquired by the device. OS data drive 350 may operate using an OS file system 470, as shown in FIGS. 4A-4C. File system 470 may be the same file system as OS file system 420. However, OS file system 470 does not need to be a snapshot-capable file system. As discussed in more detail below, however, a non-snapshot-capable OS file system 470 may nonetheless benefit from the reduced storage requirements provided by data drive 300 having snapshot capable file system 420.

Returning to FIGS. 3A and 4A, data set 310 contains snapshots of operating system images corresponding to operating system images on the master server 10, along with their associated data blocks. For example, snapshot 332 is associated with data blocks 338A, 338B, and 338C, shown with solid lines. Snapshot 332 corresponds to image 372, which may be a self-contained image stored in the OS data set 360. Snapshot 332 may also correspond to an image on the master server 10, such as image 232 in OS images database 230 shown in FIG. 2B. As shown in FIGS. 3A and 4A, image 372 is the current operating system for the target device 101, and contains the equivalent data of blocks 338A, 338B, and 338C formed as image 372. According to some embodiments, the target device 101 may be provisioned with snapshot 332 and image 372. According to other embodiments, the target device receives snapshot 332 using the same process described below for receiving snapshots 334 and/or 336. According to some embodiments, all or part of system images stored in OS data set 360 may be read-only. According to some embodiments, the target device may read and write to images in the OS data set 360.

Figure 3B:
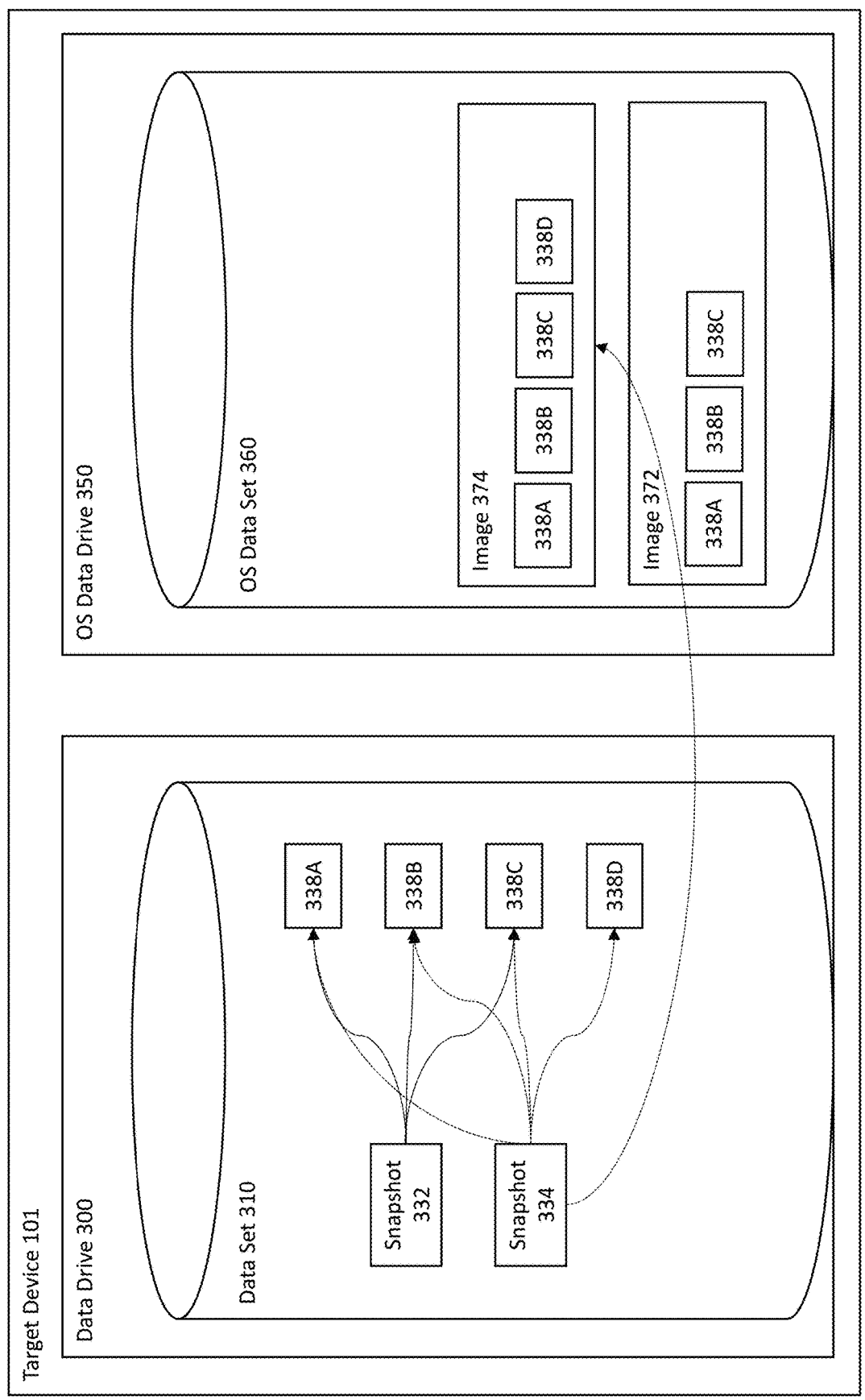

As shown in FIGS. 3B and 4B, after checking in with the master server 10, it may be determined that target device 101 requires an operating system update, as discussed above with reference to FIGS. 2A and 2B. As shown in FIGS. 3B and 4B, the target device may receive and store data representative of snapshot 334. Snapshot 334 corresponds to data blocks 338A, 338B, 338C, and 338D, shown with dotted lines. As discussed above, according to an embodiment, the master server 10 may only send an incremental update including block-level differences to the target device 101. Accordingly, the target device may only receive data block 338D and information indicating that snapshot 334 should also include data blocks 338A, 338B, and 338C. Since the target device already has data blocks 338A, 338B, and 338C stored in dataset 310, sending the new data block 338D and information indicating blocks 338A, 338B, and 338C is equivalent to sending the full snapshot 334. Thus, the target device may be provided with the equivalent of snapshot 334 without having to send down each of data blocks 338A, 338B, 338C, and 338D. The target device 101 does not need to receive and/or overwrite data blocks 338A, 338B, and 338C in order to store snapshot 334. Accordingly, the amount of data transferred to target device 101 is minimized, thereby saving time and network resources. Furthermore, as discussed in more detail below, storing only the block-level differences between different operating system images in the data set 310 allows for the target device 101 to maintain a backup of previous operating system releases without having to store each new release as a self-contained image in data set 310.

As shown in FIGS. 3B and 4B, the target device may build an image 374 having equivalent data to the data blocks 338A, 338B, 338C, and 338D associated with snapshot 334, and export image 374 to the OS data set 360. For example, the image 374 may be copied to the OS data set 360. The target device may then be booted from the image 374, completing the update from the operating system of image 372 to the operating system of image 374. Thus, the target device does not need to overwrite image 372 in order to write updates to the operating system. Instead, the image 374 may be built from snapshot 334 in the data set 310. Building and exporting of image 374 may be performed in the background during normal operation of the target device 101. Operation of target device 101 need only be interrupted to reboot from image 374. Accordingly, the target device may easily and efficiently update its operating system to a new release without interrupting normal operation. Furthermore, as explained in more detail with reference to FIGS. 5G-5H, the target device may maintain copies of old images such as image 372 to revert back to old releases.

Figure 3C:
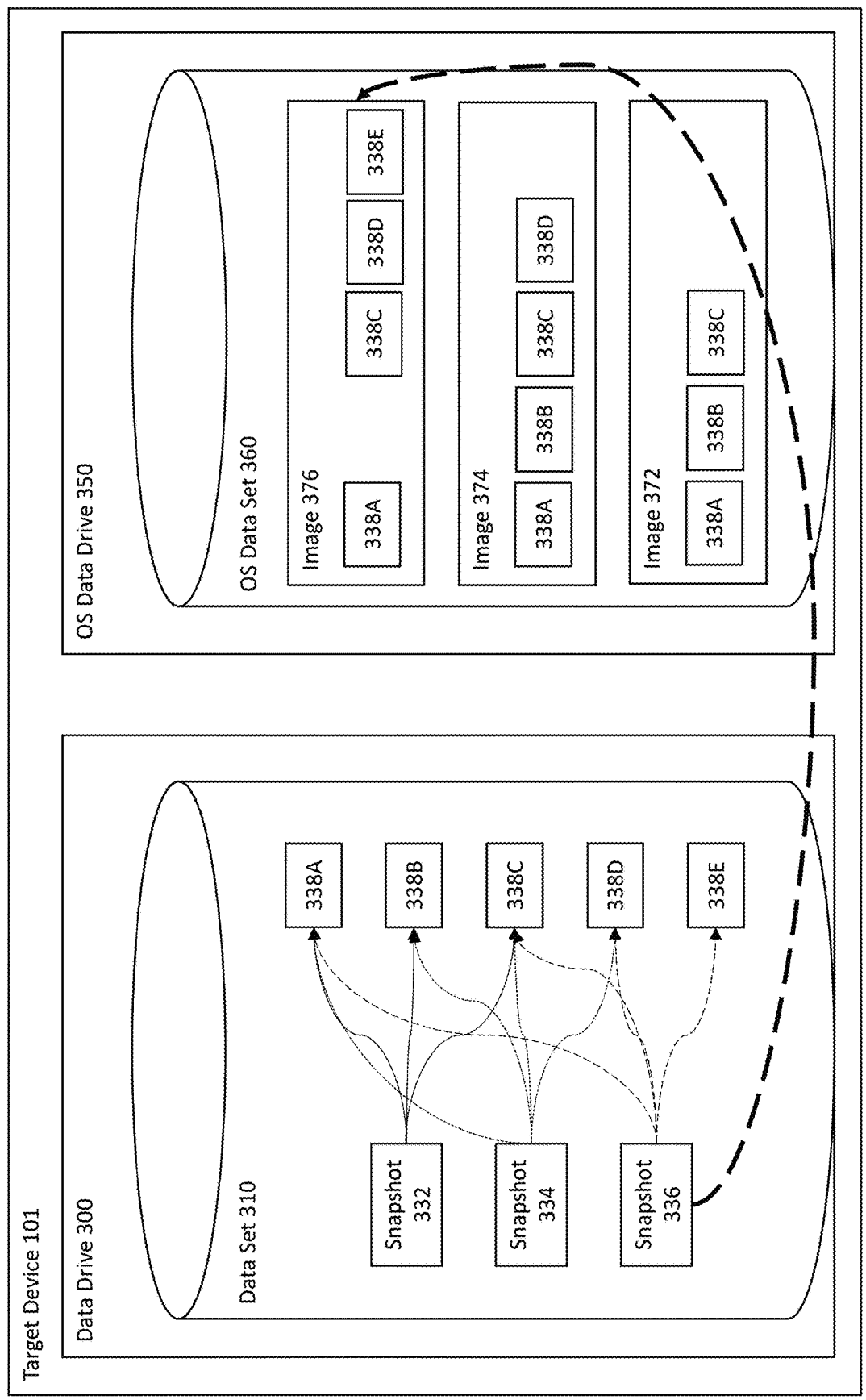

FIGS. 3C and 4C show the addition of another operating system release. As shown in FIGS. 3C and 4C, target device 101 receives and stores snapshot 336 associated with data representing the file level differences between images 374 and 376. This corresponds to receiving new block 338E and receiving information indicating that snapshot 336 should point to existing data blocks 338A, 338B, and 338C, shown with dashed lines. Target device 101 may, in the background, build and export image 376 having equivalent data of the snapshot 336 to OS data set 360. The target device may then reboot into image 376.

Figure 3D:
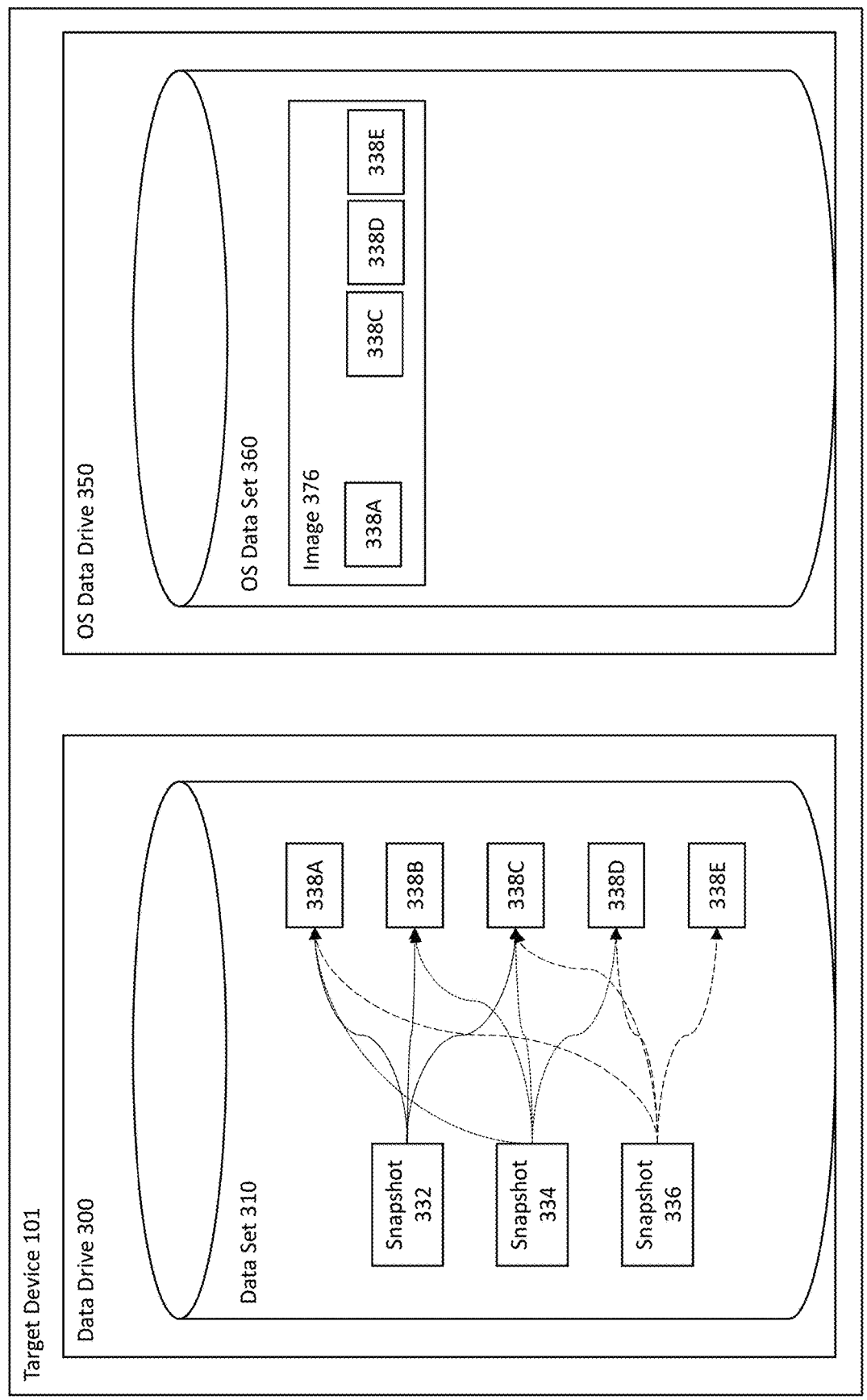

Although FIGS. 3B-3C and 4B-4C show that images 372 and 374 are maintained in OS data set 360, according to some embodiments one or more of images 372 and 374 may be removed upon successfully rebooting into images 374 and 376, respectively. For example, as shown in FIG. 3D, images 372 and 374 have been removed from OS data set 360. This saves space on the OS data drive 310. However, although images 372 and 374 have been removed, snapshots 334 and/or 332 may be maintained in data set 310, thereby allowing for easy reversion back to old operating systems.

Figure 3E:
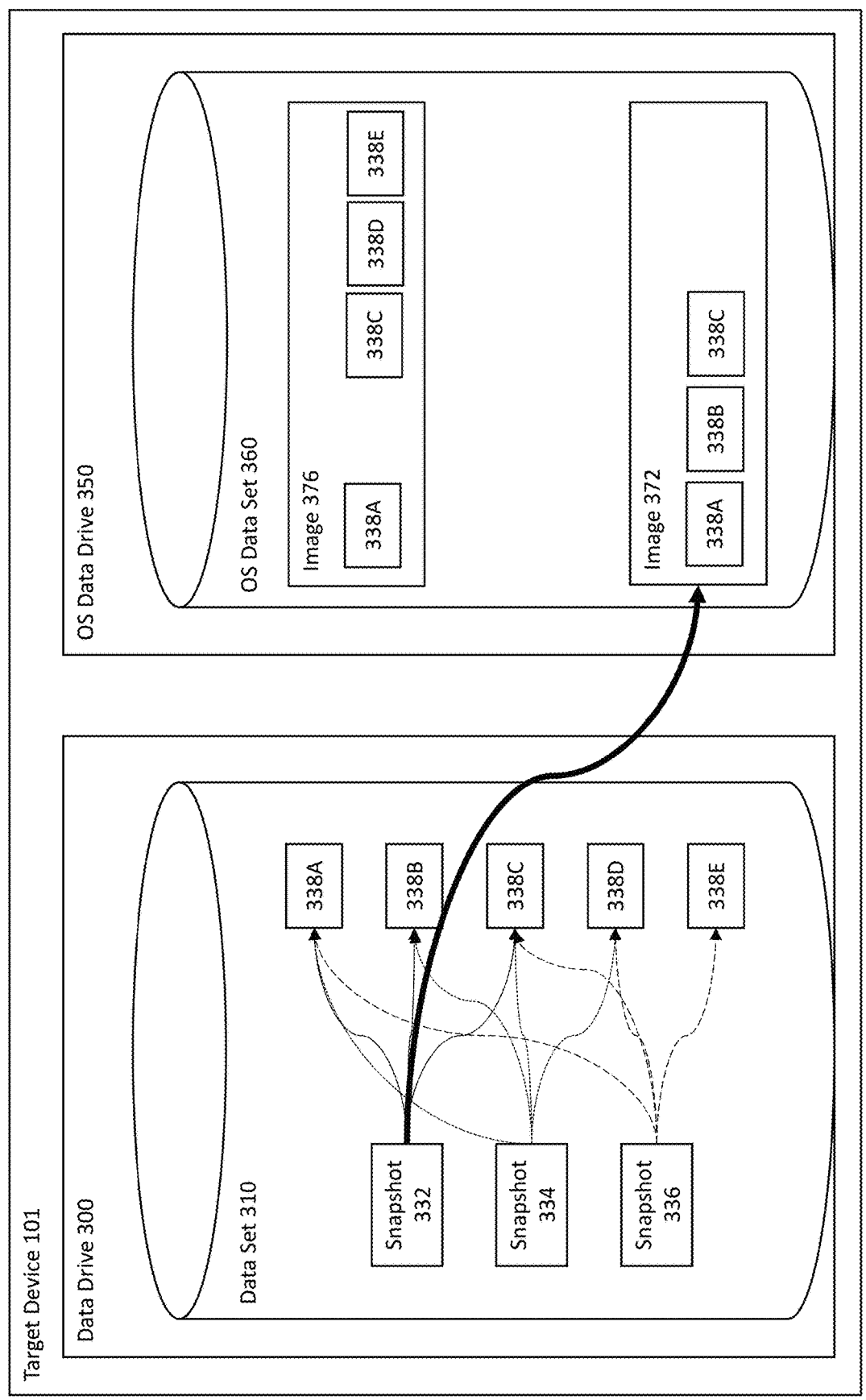

FIG. 3E shows reversion back to image 372. As shown in FIG. 3E, image 372 is built from snapshot 332 to have equivalent data of snapshot 332, including blocs 338A, 338B, and 338C. After image 372 is exported to OS data set 360, the target device 101 may boot from image 372 instead of image 376 in order to complete reversion back to the operating system release contained in snapshot 332 and image 372. Accordingly, the target device may revert back to any previous operating system without having to store complete images of each previous operating system. However, OS data drive 350 itself does not need to be, and in some embodiments is not, a snapshot capable file system.

Figure 5A:
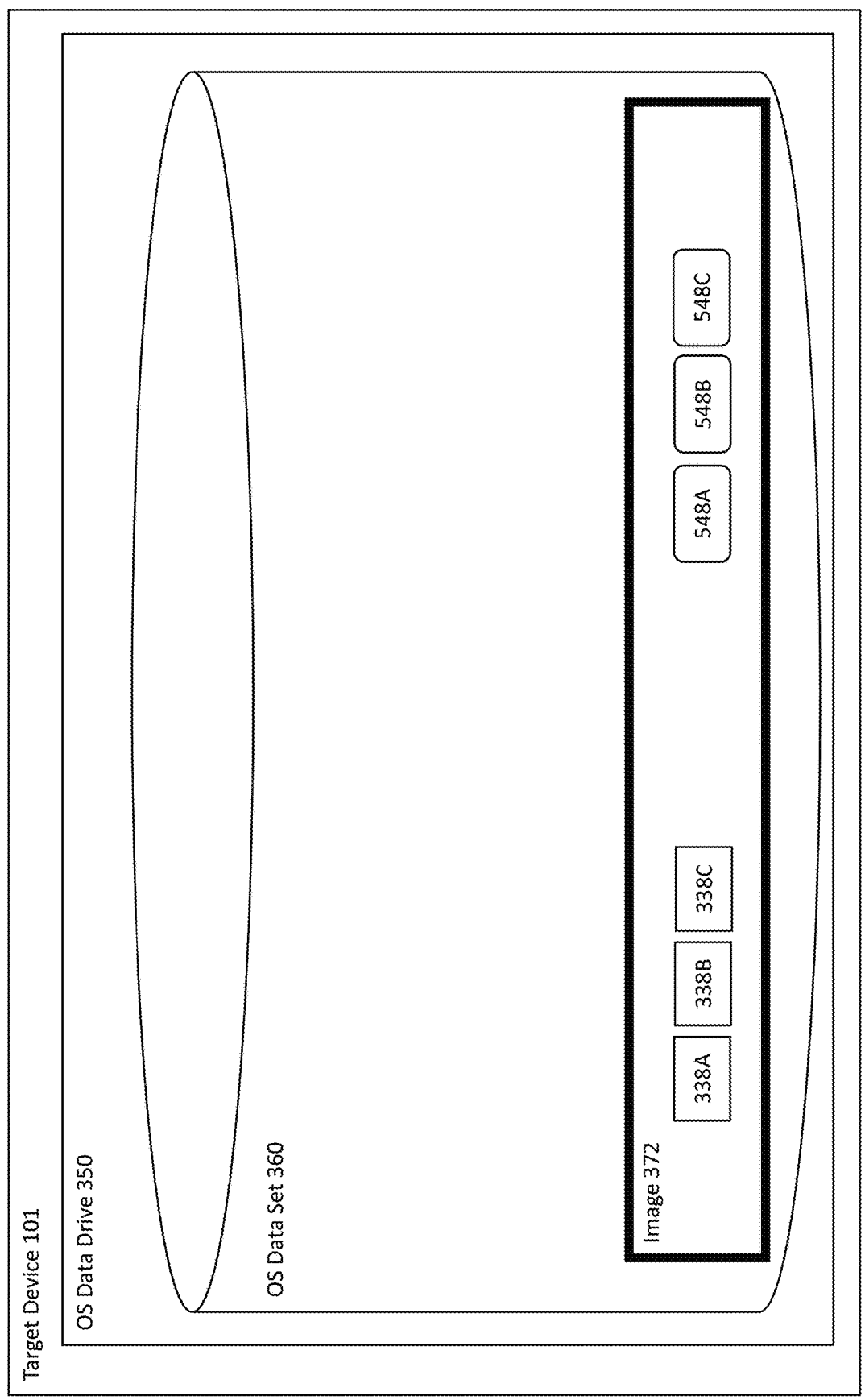

FIGS. 5A-5K show the data drive 350 of a target device 101, according to some embodiments. As shown in FIG. 5A, OS data set 360 contains image 372 having equivalent data of blocks 338A, 338B, 338C on OS data drive 350 as described in more detail with reference to FIGS. 3A and 4A. As shown with a bold line, target device operates from image 372 in FIGS. 3A and 4A. During operation, image 372 may be adjusted to contain custom user configurations 548A, 548B, and 548C that are specific to target device 101. User configurations 548A, 548B, and 548C may include configurations related to things such as, but not limited to backup schedules, a device's host name, a background image for a web interface, or other custom device-specific configurations. It is desirable to maintain those user configurations when upgrading to a new image.

Figure 5C:
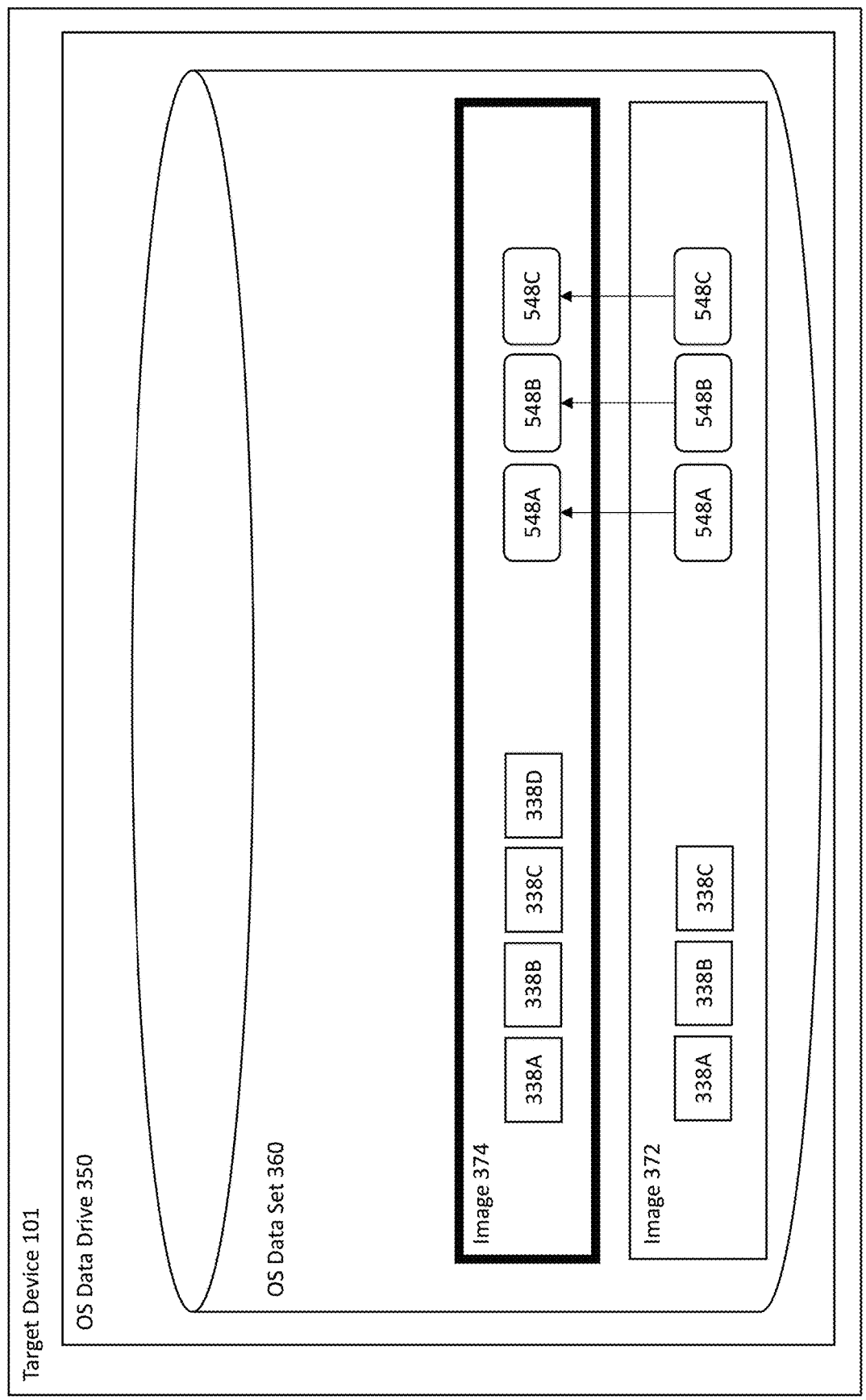
Figure 5D:
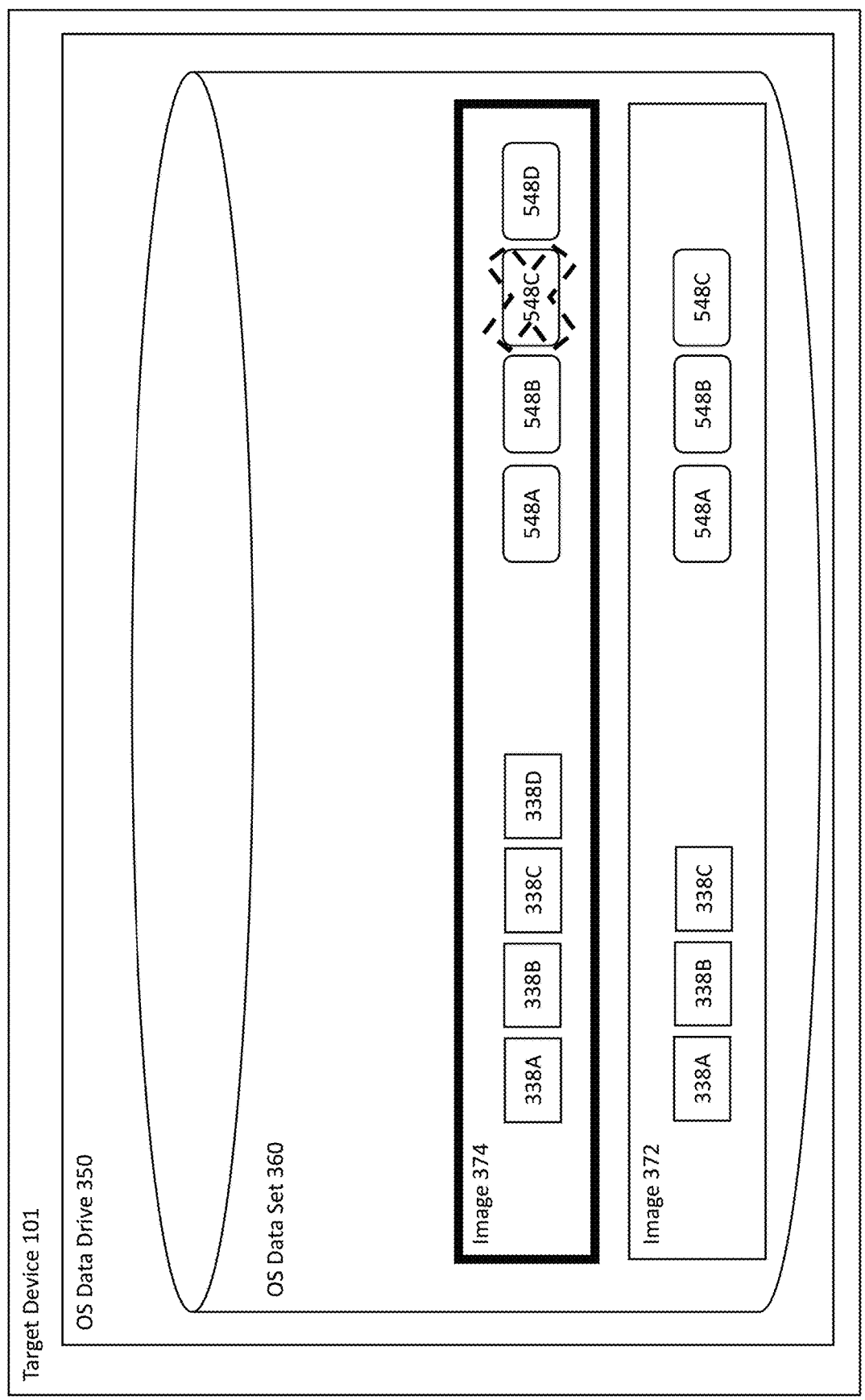
Figure 5E:
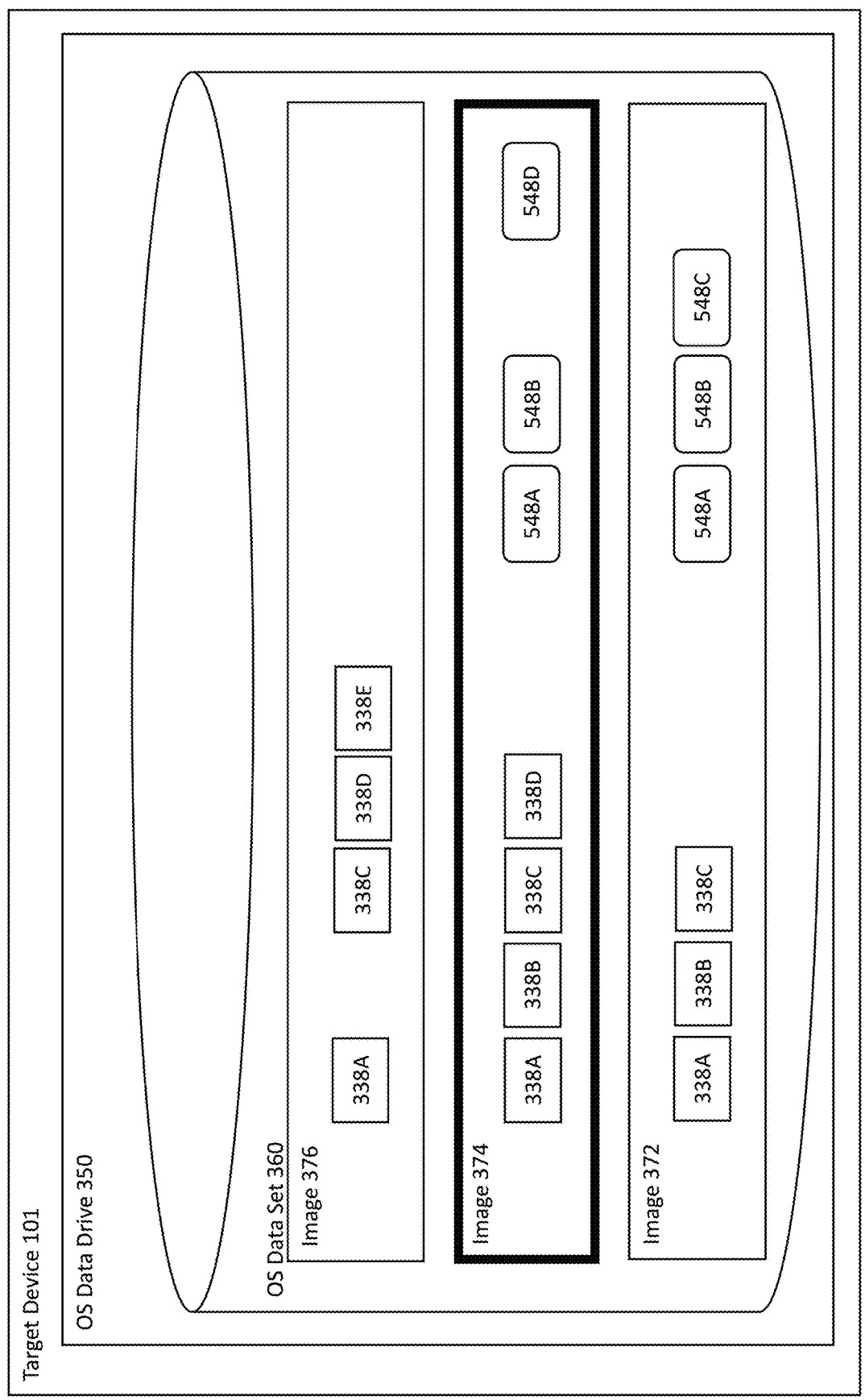
Figure 5F:
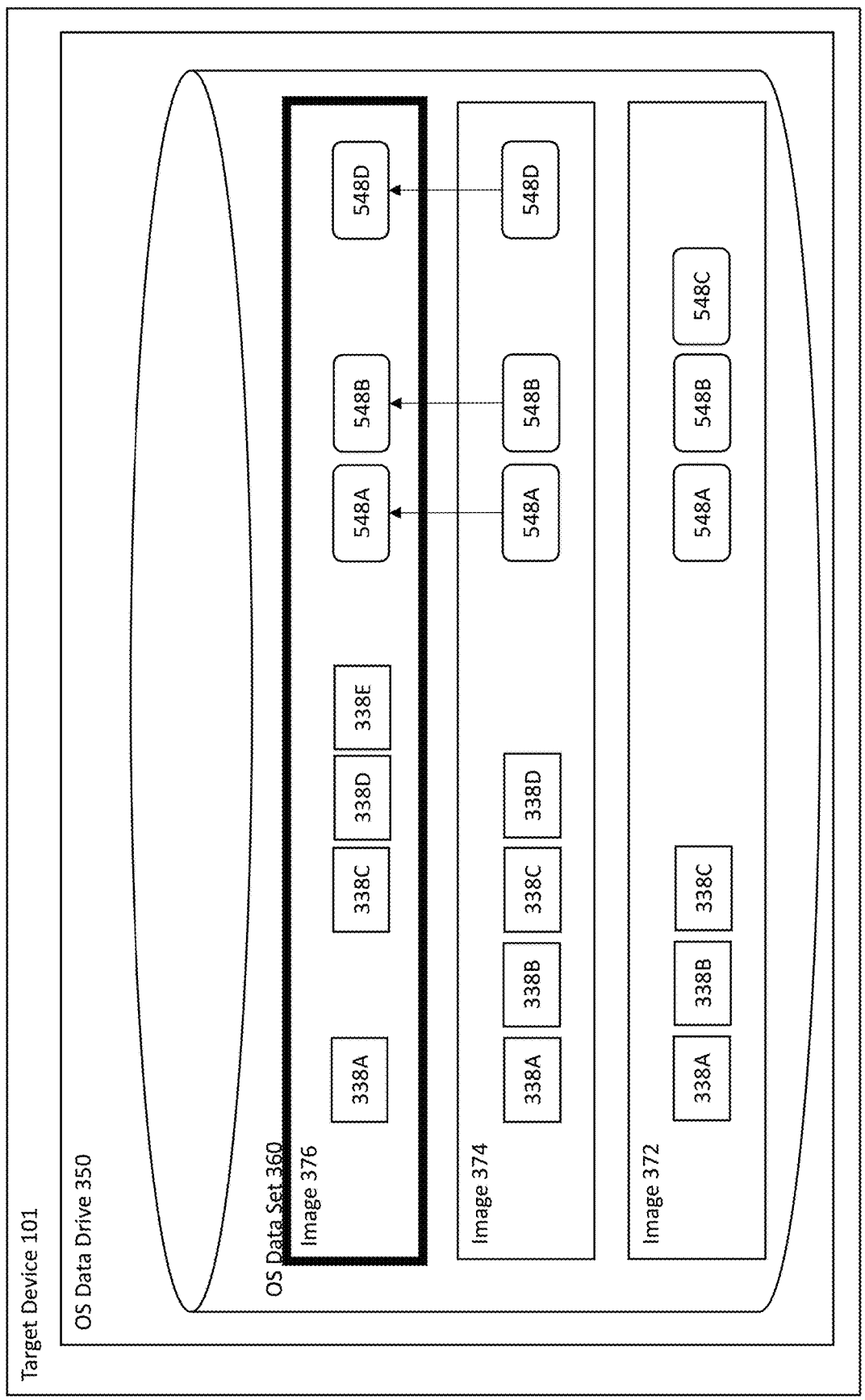

As shown in FIG. 5B, image 374 having equivalent data of blocks 338A, 338B, 338C, 338D may be exported to OS data set 360. However, prior to booting from new image 374, it is first desirable to move user configurations 548A, 548B, and 548C to the new image 374. This process is shown in FIG. 5C. Once the image 374 has been properly stored in OS data set 360 and populated with user configurations 548A, 548B, and 548C, the target device 101 may then be booted into image 374 to complete the update process. During operation, as shown in FIG. 5D, user configuration 548C may be removed (as illustrated by the dashed cross marking) and user configuration 548D may be added. FIGS. 5E-5F show a similar process to FIGS. 5B-5C whereby new image 376 having equivalent data of blocks 338A, 338C, 338D, and 338E corresponding to snapshot 336 (as described with reference to FIGS. 3C and 4C) are exported to OS data set 360, and user configurations 548A, 548B, and 548D are applied to image 376 prior to booting from image 376.

Figure 5G:
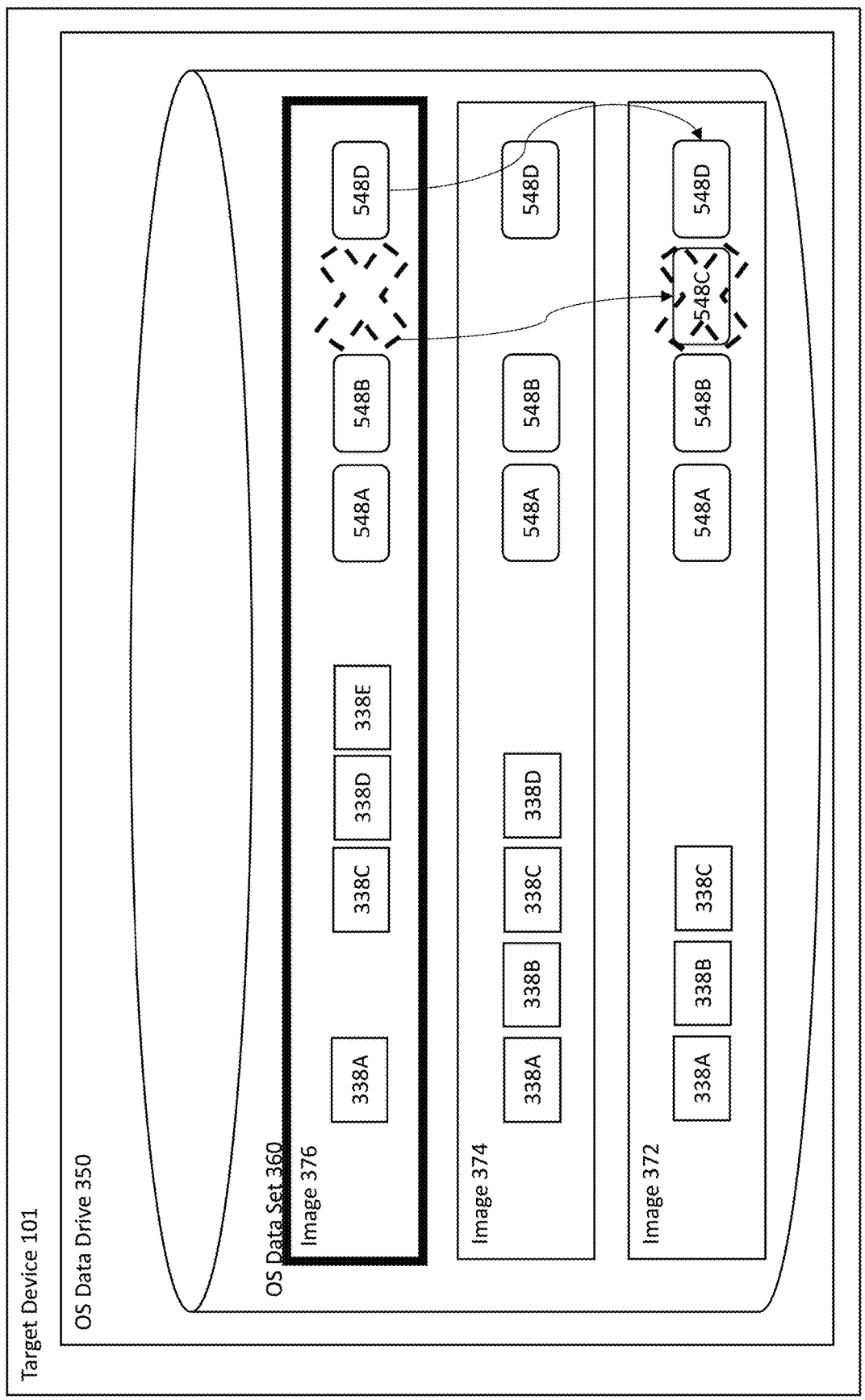
Figure 5H:
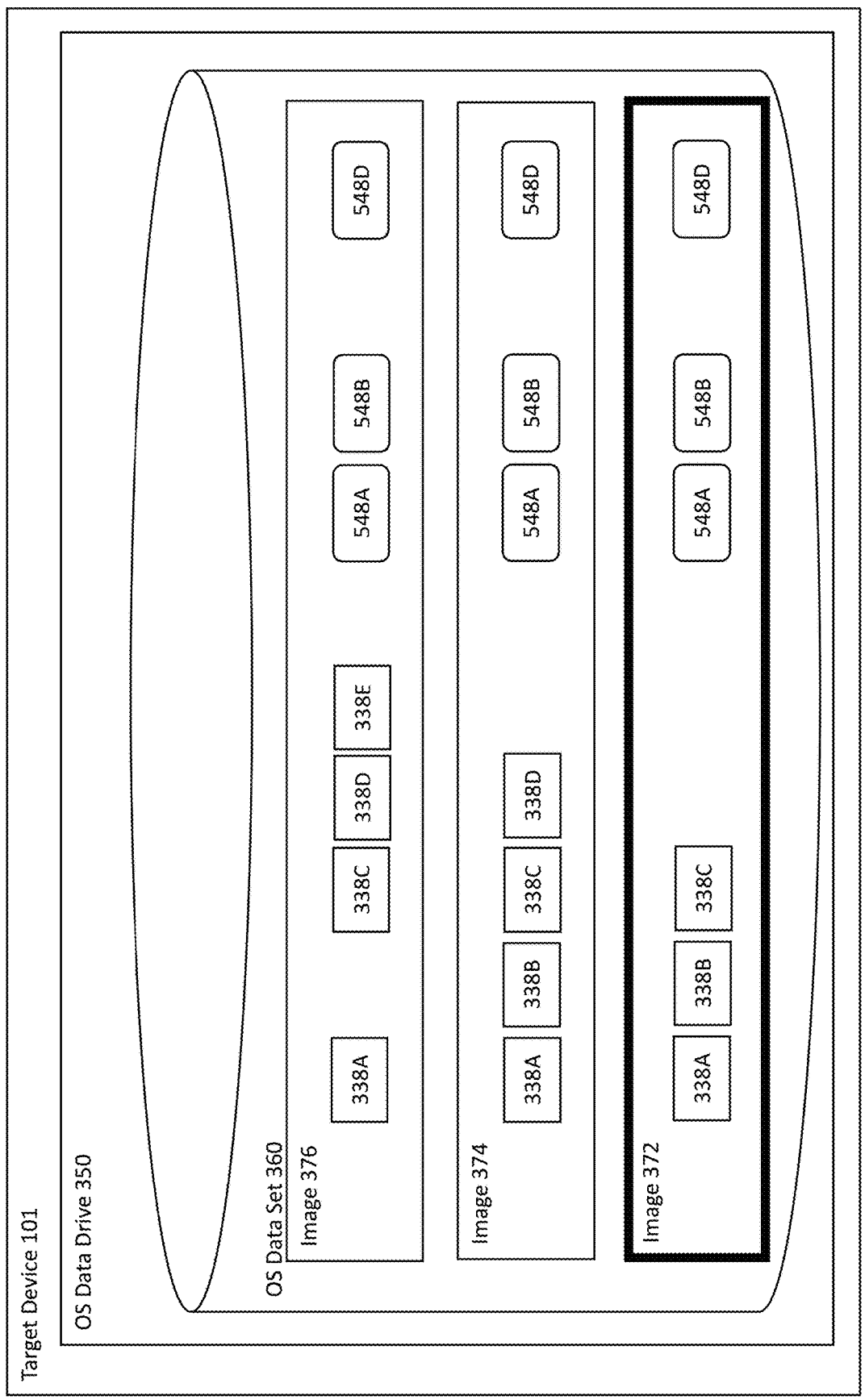
Figure 5I:
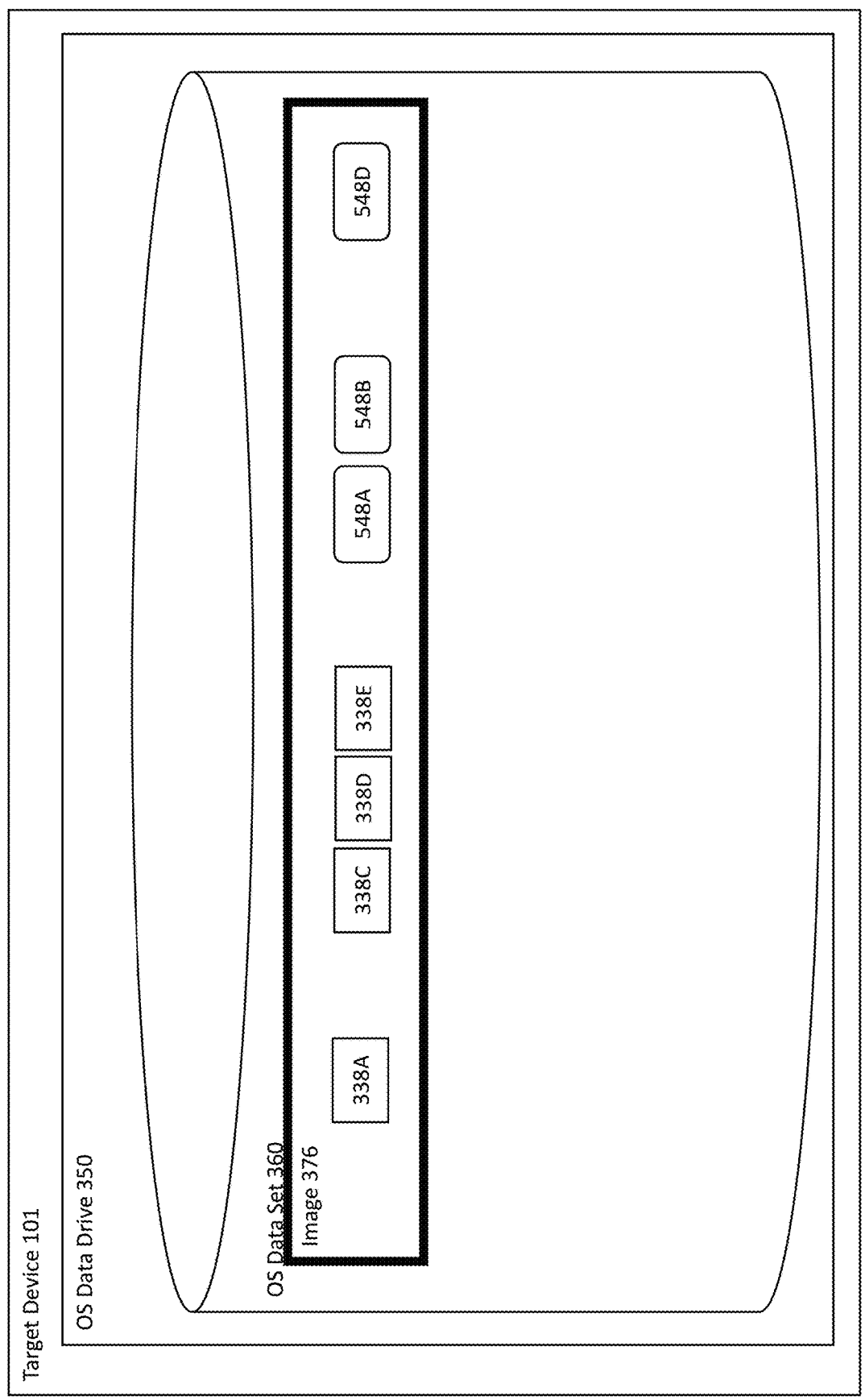
Figure 5J:
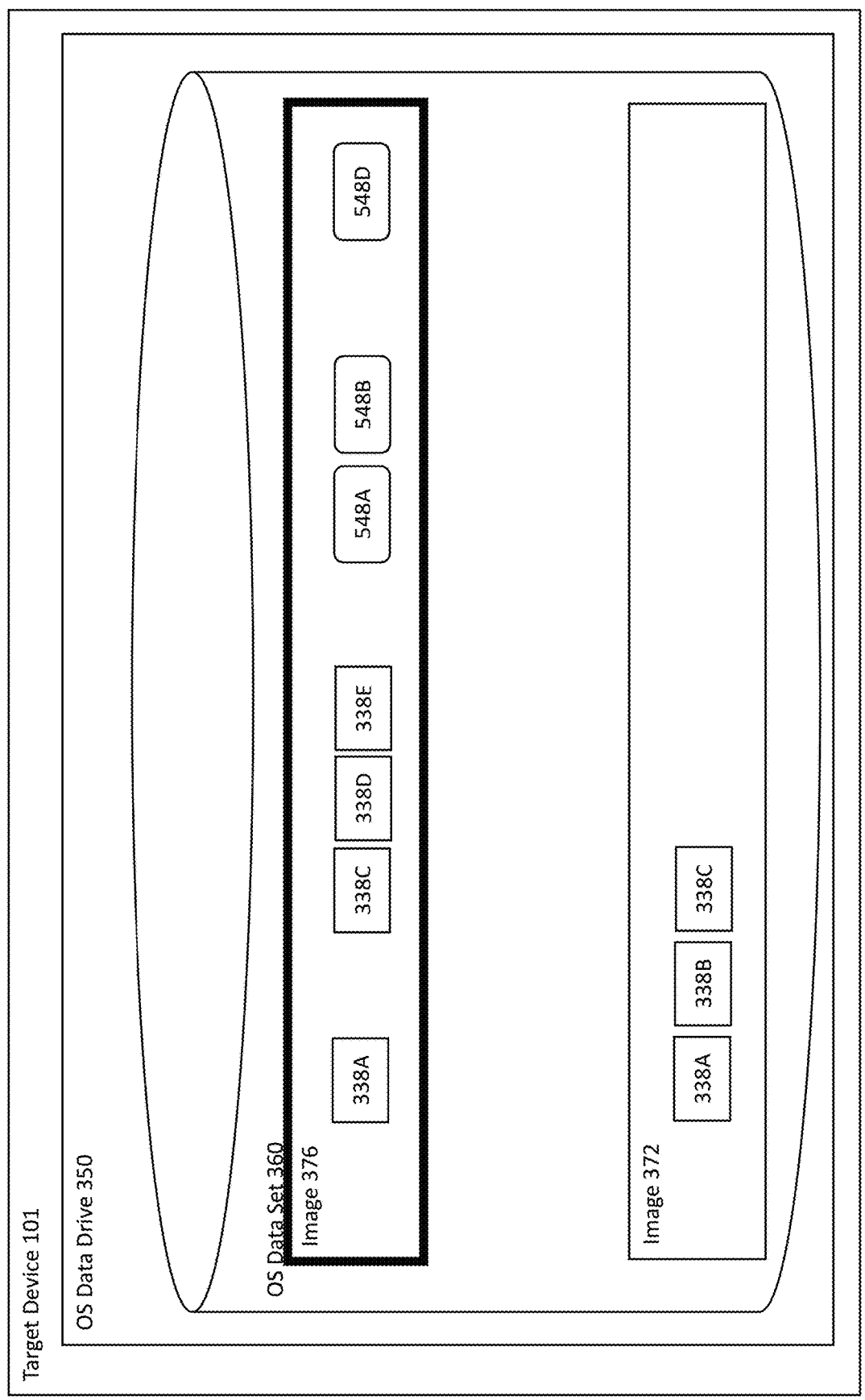

FIGS. 5G-5K show reversion back from image 376 to 372. As discussed above, it is desirable to maintain user configurations that may change over time. As shown in FIG. 5G, the target device 101 may remove user configuration 548C from images 376 (during operation) and 372 (during reversion) and add user configuration 548D to the image 372 (during reversion). Then, as shown in FIG. 5H, the target device 101 may be booted from image 372 with updated target device user configurations 548A, 548B, and 548D. Accordingly, target device 101 may easily revert back to older operating system releases without needing to communicate with the master server 10.

As discussed above with reference to FIGS. 3D and 3E, it may be desirable to remove old operating system images on the OS data set 360 in order to save space. Therefore, as shown in each of FIGS. 3E and 4I the images 372 and 374 may be removed from OS data set 360. However, as discussed with reference to FIGS. 3D and 3E, the snapshots 332 and 334 may be maintained in data set 310 without having to store two entire operating system images in OS data set 360. When, as discussed above, it is determined that target device 101 is to revert back to image 372, it is built and exported to OS data drive 350, as shown in each of FIGS. 3E and 4J. According to some embodiments, before rebooting from image 372, current target device user configurations 548A, 548B, and 548D may be added to image 372, as shown in FIG. 5K. Thus, the device may be easily booted from a previous operating system release without having to store the entire operating system image for every release. While data stored with each operating system image on the target device 101 would increase linearly with the number of releases, since data set 310 receives and stores an incremental update including block-level differences for each release associated with snapshots of each operating system release, memory usage is significantly reduced. These benefits may be realized even where OS data drive 350 does not operate using a snapshot-capable file system. According to some embodiments, two operating system images are maintained on OS data drive 350 in order to save time in the event that the most current release becomes undesirable or inoperable. Accordingly, a "plan B" operating system image is always maintained on OS data drive 350, according to some optional embodiments. When a new operating system image is exported and successfully booted, the oldest image on OS data drive 350 may be removed.

Although the methods and systems described above relate to updating operating systems, the same techniques and systems may be applied to other types of software such as, but not limited to firmware or applications. For example, block-level difference of snapshots of application images may be provided to the target device 101 in an incremental update in order to build a data set of snapshots of images of different application releases. Application images may be built from the data blocks associated with each snapshot, and the image exported to an application data set. The application may then be shut down and restarted using the new application image. Similarly, target application user configurations may be updated between versions. Furthermore, the methods and systems described herein relate to updating software. Updating may refer simply to changing software, for example to different software. Software changes may include changing to a new release or an older release (or downgraded version), or an alternative release with different features, functionalities, processes, or other aspects. Updating may include, but is not limited to upgrading, testing, fleet conformity, compatibility with particular software, firmware, hardware, and the like. Upgrades, downgrades, or changes may only occur for particular subcomponents of the software.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

In many instances in this disclosure, various components, including computing devices and computers, have been depicted and described as single objects. However, it is to be understood that each of those components can comprise more than a single object. For example, the target device 101 (FIGS. 3A-4K) can comprise two or more physical machines that host one or more VMs.

Various other modifications, including additions and removals, can be made to the exemplary embodiments discussed without departing from the scope of the present disclosure. For example, while the embodiments described above refer to particular features, components, or particular steps, the scope of this disclosure also includes embodiments having different combinations of features, components, or steps, and embodiments that do not include all of the above described features, components, or steps.

It is to be understood that the disclosed subject matter is not limited in its application to the details of construction and to the arrangements of the components set forth in the description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter.

The invention claimed is:

1. A method of updating an operating system on a target device using incremental updates, comprising:
    storing, in a target device memory a first operating system image according to a first file system on the target device;
    storing, in the target device memory, a snapshot of the first operating system image in a target-device-held series of snapshots according to a second file system on the target device that is snapshot capable;
    receiving, by the target device and from a remote storage device, data equivalent to a snapshot of a second operating system image, the second operating system image being an image of an updated version of the first operating system image;
    forming the snapshot of second operating system image from the data equivalent to the snapshot of the second operating system image;
    storing, in the target device, the snapshot of the second operating system image in the target-device-held series of snapshots according to the second file system on the target device;
    exporting, to the target device memory, a second operating system image containing data representative of the snapshot of the second operating system image;
    storing, in the target device memory the second operating system image according to the first file system on the target device; and booting the target device using the second operating system image.

2. The method of claim 1, wherein the equivalent data of the snapshot of the second operating system image is an incremental operating system update representative of a difference between the snapshot of the first operating system image and the snapshot of the second operating system image.

3. The method of claim 2, wherein the forming the snapshot of the second operating system image comprises snapshotting the incremental operating system update and at least some of the data associated with the snapshot of the first operating system image.

4. The method of claim 1, further comprising copying user configurations from the first operating system image to the second operating system image according to the first file system on the target device.

5. The method of claim 1, wherein the first file system on the target device is not a snapshot-capable operating system.

6. The method of claim 1, further comprising maintaining, in the target-device-held series of snapshots the snapshot of the first operating system image and the snapshot of the second operating system image representing pairwise differences between the first operating system image and the second operating system image.

7. The method of claim 1, wherein the storing, in the target device memory the second operating system image includes maintaining data blocks representative of the first operating system image in the first file system on the target device.

8. The method of claim 7, further comprising:
determining the success of the boot of the target device using the second operating system image; and
on the condition of determining an unsuccessful boot of the target device, booting the target device using the first operating system image.

9. The method of claim 1, further comprising receiving, during a target device check-in, a notification that the target device is scheduled to receive equivalent data of the snapshot of the second operating system image from a plurality of snapshots of a plurality of operating system images stored on the remote storage device.

10. The method of claim 9, further comprising transmitting, to the remote storage device, information identifying the operating system version of the first operating system image.

11. A method of updating an operating system on a target device using incremental updates, comprising:
storing, in a target device first data set a first operating system image;
storing, in a target device second data set, a snapshot of the first operating system image comprising a first set of data blocks representing the first operating system image and information pointing to the first set of data blocks;
receiving, by the target device and from a remote storage device, data equivalent to a snapshot of a second operating system image, wherein the second operating system image is an image of an updated version of the first operating system image and wherein the data equivalent to a snapshot of the second operating system image includes at least one additional data block representing one or more pairwise differences between the snapshot of the first operating system image and the snapshot of the second operating system image;
forming the snapshot of second operating system image from the data equivalent to the snapshot of the second operating system image, wherein the snapshot of the second operating system image comprises at least one of the blocks in the first set of data blocks and the at least one additional data block;
storing, in the target device second data set, the snapshot of the second operating system image;
exporting, to the target device first data set, a second operating system image containing data representative of the snapshot of the second operating system image;
storing, in the target device first data set the second operating system image; and
booting the target device using the second operating system image.

12. The method of claim 11, wherein the equivalent data of the snapshot of the second operating system image is an incremental operating system update, and the equivalent data of the snapshot of the second operating system image further comprises information identifying the blocks to be included in the snapshot of the second operating system image.

13. The method of claim 12, wherein the forming the snapshot of the second operating system image comprises snapshotting at least one of the blocks in the first set of data blocks and the at least one additional data block based on the information identifying the blocks to be included in the snapshot of the second operating system image.

14. The method of claim 11, further comprising copying user configurations from the first operating system image to the second operating system image according to the target device first data set.

15. The method of claim 11, wherein the target device first data set is stored according to a file system that is not a snapshot-capable file system.

16. The method of claim 11, wherein the target device second data set is stored according to a file system that is a snapshot-capable file system.

17. The method of claim 11, further comprising maintaining, in the target device second data set the snapshot of the first operating system image and the snapshot of the second operating system image.

18. The method of claim 11, wherein the storing, in the target device first data set the second operating system image includes maintaining blocks representative of the first operating system image in the target device first data set.

19. The method of claim 18, further comprising:
determining of the boot of the target device using the second operating system image was successful; and
on the condition of determining an unsuccessful boot of the target device, booting the target device using the first operating system image.

20. The method of claim 11, further comprising receiving, during a target device check-in, a notification that the target device is scheduled to receive equivalent data of the snapshot of the second operating system image from a plurality of snapshots of a plurality of operating system images stored on the remote storage device.

21. The method of claim 20, further comprising transmitting, to the remote storage device, information identifying the operating system version of the first operating system image.

22. A method of updating operating systems on a fleet of target devices using incremental updates, comprising:
storing, a first operating system image in a first data set on at least one target device of the fleet of target devices;
storing, a snapshot of the first operating system image comprising a first set of data blocks representing the first operating system image and information pointing to the first set of data blocks in a second data set on the at least one target device of the fleet of target devices;

receiving, by the at least one target device of the fleet of target devices and from a remote storage device, first data equivalent to a snapshot of a second operating system image, wherein the second operating system image is an image of an updated version of the first operating system image and wherein the data equivalent to a snapshot of the second operating system image includes at least one additional data block representing one or more pairwise differences between the snapshot of the first operating system image and the snapshot of the second operating system image;

forming the snapshot of second operating system image from the first data equivalent to the snapshot of the second operating system image, wherein the snapshot of the second operating system image comprises at least one of the blocks in the first set of data blocks and the at least one additional data block;

storing, in the second data set on the at least one target device of the fleet of target devices, the snapshot of the second operating system image;

exporting, to the first data set on the at least one target device of the fleet of target devices, a second operating system image containing data representative of the snapshot of the second operating system image;

storing, in the first data set on the at least one target device of the fleet of target devices the second operating system image; and booting the at least one target device of the fleet of target devices using the second operating system image.

23. The method of claim 22, further comprising:

storing, a third operating system image in a first data set on at least one other target device of the fleet of target devices;

storing, a snapshot of the third operating system image comprising a third set of data blocks representing the third operating system image and information pointing to the first set of data blocks in a second data set on the at least one other target device of the fleet of target devices;

receiving, by the at least one other target device of the fleet of target devices and from a remote storage device, second data equivalent to the snapshot of a second operating system image, wherein the second operating system image is an image of an updated version of the third operating system image and wherein the data equivalent to a snapshot of the second operating system image includes at least one other additional data block representing one or more pairwise differences between the snapshot of the third operating system image and the snapshot of the second operating system image;

forming the snapshot of second operating system image from the second data equivalent to the snapshot of the second operating system image, wherein the snapshot of the second operating system image comprises at least one of the blocks in the third set of data blocks and the at least one other additional data block;

storing, in the second data set on the at least one other target device of the fleet of target devices, the snapshot of the second operating system image;

exporting, to the first data set on the at least one other target device of the fleet of target devices, a second operating system image containing data representative of the snapshot of the second operating system image;

storing, in the first data set on the at least one other target device of the fleet of target devices the second operating system image; and booting the at least one other target device of the fleet of target devices using the second operating system image.

24. The method of claim 23, wherein at least one of the first equivalent data of the snapshot of the second operating system image and the second equivalent data of the snapshot of the second operating system image is an incremental operating system update, and the at least one of the first equivalent data of the snapshot of the second operating system image and the second equivalent data of the snapshot of the second operating system image further comprises information identifying the blocks to be included in the snapshot of the second operating system image.

25. The method of claim 24, wherein the forming the snapshot of the second operating system image from at least one of from the first data equivalent to the snapshot of the second operating system image and the second data equivalent to the snapshot of the second operating system image comprises snapshotting at least one of the blocks in the first set of data blocks and the at least one additional data block and at least one of the blocks in the third set of data blocks and the at least one other additional data block based on the information identifying the blocks to be included in the snapshot of the second operating system image.

26. The method of claim 23, further comprising copying user configurations from the first operating system image to the second operating system image according to the first data set on at least one target device.

27. The method of claim 23, wherein the first data set on at least one target device is stored according to a file system that is not a snapshot-capable file system.

28. The method of claim 23, wherein the second data set on the at least one target device is stored according to a file system that is a snapshot-capable file system.

29. The method of claim 23, further comprising maintaining, in the second data set on the at least one target device the snapshot of the first operating system image and the snapshot of the second operating system image.

30. The method of claim 23, wherein the storing, in the first data set on at least one target device the second operating system image includes maintaining blocks representative of the first operating system image in the first data set on at least one target device.

31. The method of claim 30, further comprising:

determining of the boot of the at least one target device using the second operating system image was successful; and on the condition of determining an unsuccessful boot of the at least one target, booting the at least one target using the first operating system image.

32. The method of claim 23, further comprising receiving, during a check-in for at least one of the at least one target device, a notification that the at least one target device is scheduled to receive first equivalent data of the snapshot of the second operating system image from a plurality of snapshots of a plurality of operating system images stored on the remote storage device.

33. The method of claim 23, further comprising transmitting, to the remote storage device, information identifying the operating system version of the first operating system image on the at least one target device.

* * * * *